US012732506B2

(12) United States Patent
Fainberg et al.

(10) Patent No.: US 12,732,506 B2
(45) Date of Patent: Sep. 8, 2026

(54) SEGMENTATION MANAGEMENT INCLUDING VISUALIZATION, CONFIGURATION, SIMULATION, OR A COMBINATION THEREOF

(71) Applicant: FORESCOUT TECHNOLOGIES, INC., San Jose, CA (US)

(72) Inventors: Ilya Fainberg, Tel Aviv (IL); Yafit Maor, Even-Yehuda (IL); Amir Olswang, Kidron (IL)

(73) Assignee: FORESCOUT TECHNOLOGIES, INC., San Jose, CA (US)

( * ) Notice: Subject to any disclaimer, the term of this patent is extended or adjusted under 35 U.S.C. 154(b) by 106 days.

(21) Appl. No.: 18/638,424

(22) Filed: Apr. 17, 2024

(65) Prior Publication Data

US 2024/0267293 A1 Aug. 8, 2024

Related U.S. Application Data

(63) Continuation of application No. 17/567,100, filed on Dec. 31, 2021, now Pat. No. 12,009,981, which is a (Continued)

(51) Int. Cl.
*H04L 9/40* (2022.01)
*H04L 41/0894* (2022.01)
(Continued)

(52) U.S. Cl.
CPC ........ *H04L 63/104* (2013.01); *H04L 41/0894* (2022.05); *H04L 41/0895* (2022.05); (Continued)

(58) Field of Classification Search
CPC ............... H04L 63/104; H04L 41/0894; H04L 41/0895; H04L 41/145; H04L 43/045; H04L 63/0263; H04L 41/046
See application file for complete search history.

(56) References Cited

U.S. PATENT DOCUMENTS

| | | | |
|---|---|---|---|
| 7,277,931 | B1 | 10/2007 | Booth et al. |
| 8,341,717 | B1 | 12/2012 | Delker et al. |

(Continued)

FOREIGN PATENT DOCUMENTS

| | | | |
|---|---|---|---|
| CN | 104580078 | A | 4/2015 |
| JP | 2007-243373 | A | 9/2007 |

(Continued)

OTHER PUBLICATIONS

JP Decision to Grant a Patent dated Apr. 12, 2023, (received Apr. 17, 2023) from related JP Patent Application No. 2021-500065 filed Jan. 4, 2021; 4 pages.

(Continued)

*Primary Examiner* — Abdulkader M Alriyashi
(74) *Attorney, Agent, or Firm* — Womble Bond Dickinson (US) LLP

(57) ABSTRACT

Technology for segmentation management is described. The segmentation management may include visualization, configuration, simulation, or a combination thereof, of segmentation policies. Segmentation management may include tagging entities communicatively coupled to a network, grouping the entities communicatively coupled to the network into a plurality of groups based at least on one or more tags that are associated with each of the entities, and displaying a user interface for selecting a first group and a second group from the plurality of groups. In response to receiving an input through the user interface, an indication of network traffic is displayed between the first group and the second group, where the network traffic is associated with one or more segmentation rules. In response to receiving additional input through the user interface, segmentation management configures an enforcement point with the segmentation rules.

17 Claims, 10 Drawing Sheets

Related U.S. Application Data continuation of application No. 16/144,051, filed on Sep. 27, 2018, now Pat. No. 11,271,812, which is a continuation-in-part of application No. 16/023,284, filed on Jun. 29, 2018, now Pat. No. 11,677,627.

(51) Int. Cl.

| | |
|---|---|
| ***H04L 41/0895*** | (2022.01) |
| ***H04L 41/14*** | (2022.01) |
| ***H04L 43/045*** | (2022.01) |

(52) U.S. Cl.

CPC .......... *H04L 41/145* (2013.01); *H04L 43/045* (2013.01); *H04L 63/0263* (2013.01)

(56) References Cited

U.S. PATENT DOCUMENTS

| | | | |
|---|---|---|---|
| 10,212,191 | B2 | 2/2019 | Kirner et al. |
| 10,560,452 | B2 | 2/2020 | Osaki et al. |
| 2007/0157286 | A1 | 7/2007 | Singh et al. |
| 2009/0198707 | A1 | 8/2009 | Rohner |
| 2013/0275574 | A1 | 10/2013 | Hugard IV et al. |
| 2015/0326528 | A1 | 11/2015 | Murthy et al. |
| 2016/0301717 | A1 | 10/2016 | Dotan et al. |
| 2017/0118173 | A1 | 4/2017 | Arramreddy et al. |
| 2018/0159751 | A1 | 6/2018 | Zhang et al. |
| 2018/0176185 | A1 | 6/2018 | Kumar et al. |
| 2019/0306182 | A1 | 10/2019 | Fry et al. |

FOREIGN PATENT DOCUMENTS

| | | | |
|---|---|---|---|
| JP | 2016-540463 | A | 12/2016 |
| JP | 2017-147575 | A | 8/2017 |

OTHER PUBLICATIONS

International Preliminary Report on Patentability mailed on Jan. 7, 2021, for International Application No. PCT/US2019/036106, filed Jun. 7, 2019, p. 8.

International Preliminary Report on Patentability mailed on Apr. 8, 2021, for International Application No. PCT/US2019/052018, filed Sep. 7, 2019, p. 8.

International Preliminary Report on Patentability mailed on Apr. 8, 2021, for International Application No. PCT/US2019/052017, filed Sep. 19, 2019, p. 8.

International Search report for the International Application No. PCT/US2019/052018, mailed Nov. 12, 2019.

International Search report for the International Application No. PCT/US2019/052017, mailed Nov. 12, 2019.

International Search Report and Written Opinion for International Application No. PCT/US2019/036106, mailed Sep. 8, 2019.

800

802

806

CAMPUS / OT ⋮ +

804 Campus/OT Matrix > IT to OT Detailed Traffic Filtered

808 + Add to Authorised list 810 + Add to Not Authorised list 814 816 824 840 Tree level 1 | Tree level 2 | Tree level 3 | Tree level 4 & up Status 812 (All) 830 814

822

| SERVICE | ☐ | SOURCE GROUP | DESTINATION GROUP | CONNECTIONS | STATUS (826) | FIRST SEEN (828) | LAST SEEN |
|---|---|---|---|---|---|---|---|
| **389 /RDP** | ☑ (820) | Security Camera | 2 Connections cams | 3084 | Authorized | 6/14/2018 13:25:30 EST | 6/14/2018 13:25:30 EST |
| 9100 / TCP | ☐ | | HMI | | Authorized | 6/14/2018 09:05:00 EST | 6/14/2018 09:05:00 EST |
| 9210 / UDP | ☐ | | HMI-FLS | 1000 | Authorized | 6/14/2018 09:06:00 EST | 6/14/2018 09:06:00 EST |
| 9510 / UDP | ☐ | | FLC | | Authorized | 6/13/2018 20:16:12 EST | 6/13/2018 20:16:12 EST |
| 9910 / UDP | ☑ | | Factory TLV | 2044 | Authorized | 6/14/2018 09:06:00 EST | 6/14/2018 09:06:00 EST |
| | ☑ | Admins | 3 connections cams | 3084 | Not Authorized | 6/14/2018 13:25:30 EST | 6/14/2018 13:25:30 EST |
| | ☑ | Help | 4 connections Paths | 3084 | Not Authorized | 6/14/2018 13:25:30 EST | 6/14/2018 13:25:30 EST |
| | ☑ | IT-Other | OT-Other | 3084 | Not Authorized | 6/14/2018 13:25:30 EST | 6/14/2018 13:25:30 EST |

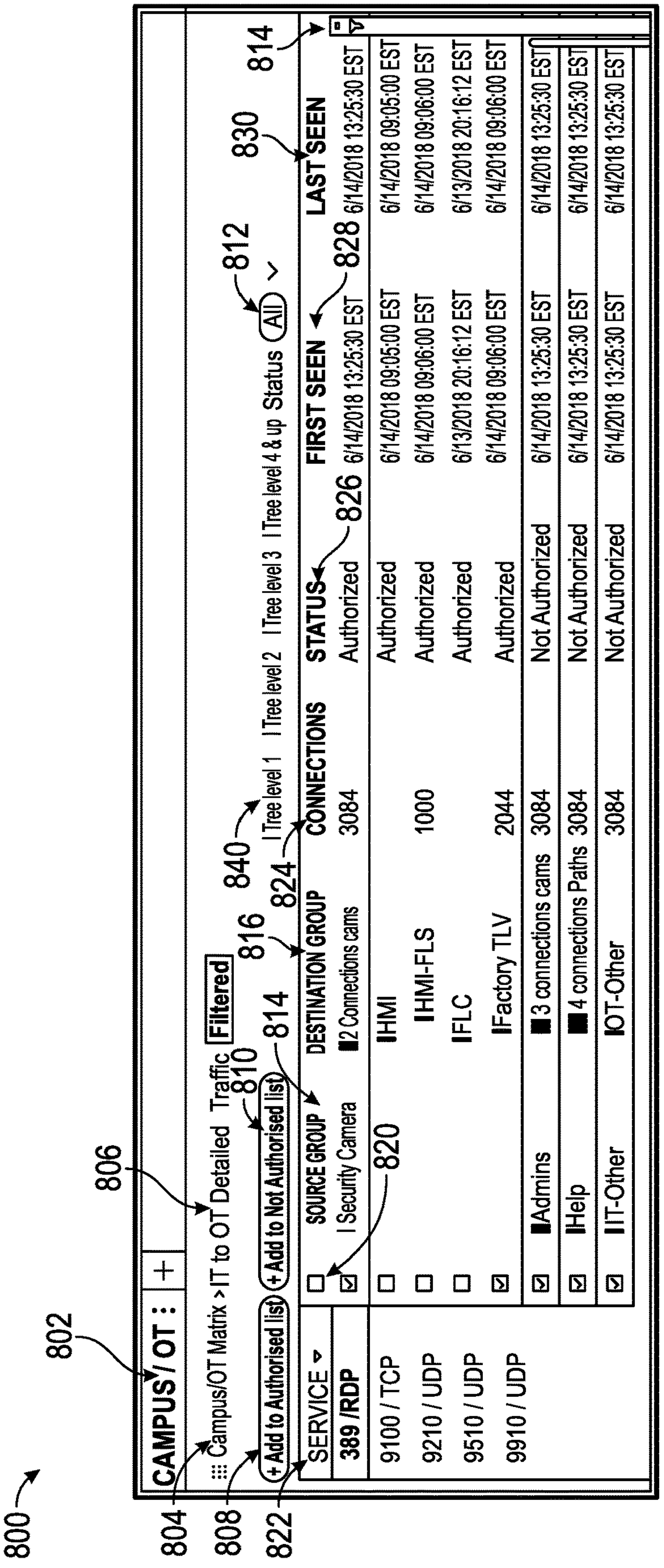

SEGMENTATION MANAGEMENT INCLUDING VISUALIZATION, CONFIGURATION, SIMULATION, OR A COMBINATION THEREOF

CROSS-REFERENCE TO RELATED APPLICATIONS

This application is a continuation of U.S. patent application Ser. No. 17/567,100, filed Dec. 31, 2021, which is a continuation of U.S. patent application Ser. No. 16/144,051, filed Sep. 27, 2018, which issued on Mar. 8, 2022, as U.S. Pat. No. 11,271,812, which is a continuation in part of U.S. patent application Ser. No. 16/023,284, filed Jun. 29, 2018, which issued on Jun. 13, 2023, as U.S. Pat. No. 11,677,627, which are hereby incorporated by reference in its entirety. This application is related to U.S. patent application Ser. No. 16/144,130, filed Sep. 27, 2018, and is hereby incorporated by reference in its entirety.

TECHNICAL FIELD

Aspects and implementations of the present disclosure relate to network segmentation, and more specifically, visualization, configuration, and simulation of network segmentation.

BACKGROUND

As technology advances, the number and variety of devices that are connected to communications networks are rapidly increasing. Each device may have its own respective vulnerabilities which may leave the network open to compromise or other risks. Preventing the spreading of an infection of a device or an attack through a network can be important for securing a communication network.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 8 depicts a diagram of aspects of an example graphical user interface including filtered group traffic in accordance with one implementation of the present disclosure.

DETAILED DESCRIPTION

Figure 1:
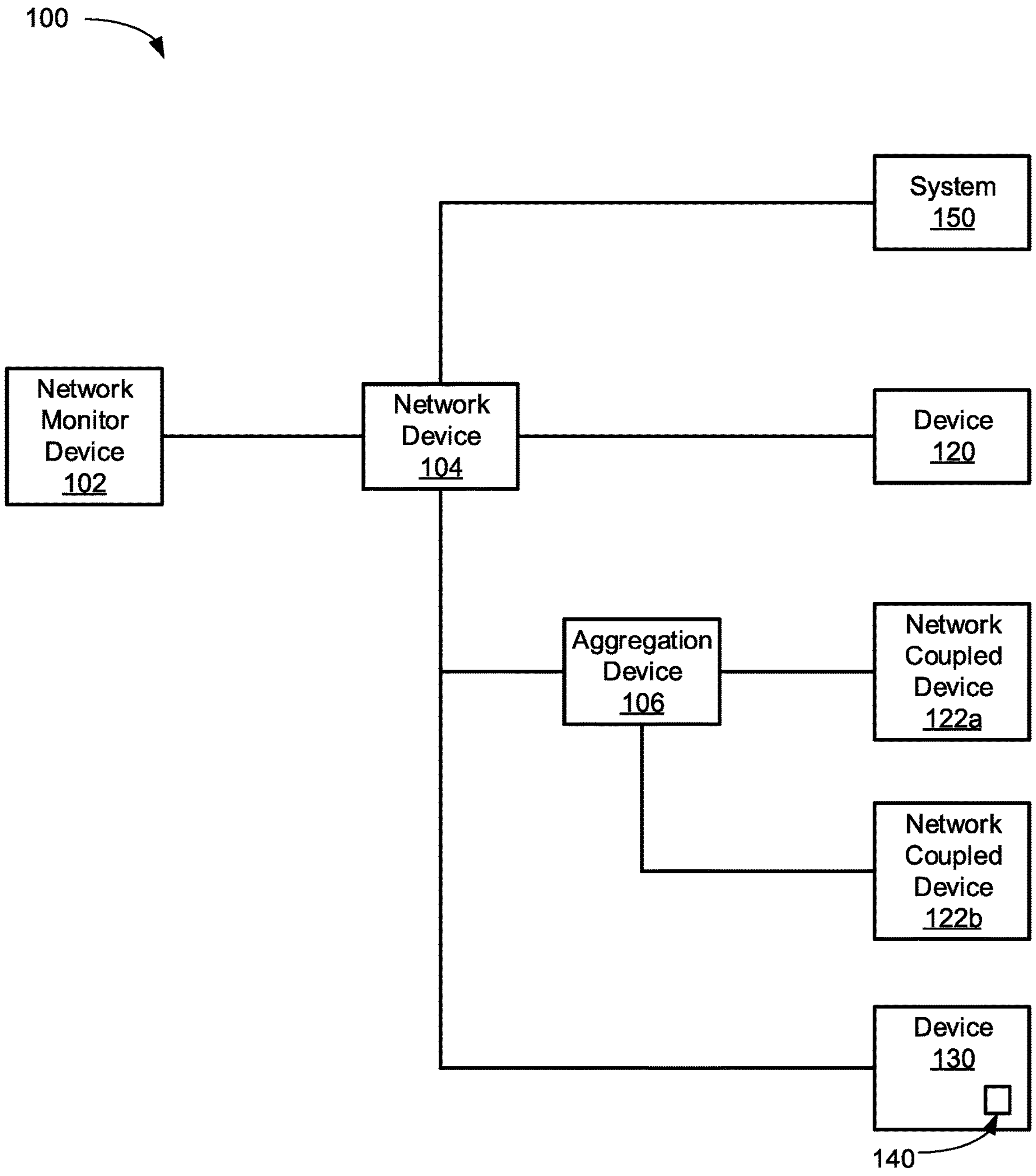
FIG. 1 depicts an illustrative communication network in accordance with one implementation of the present disclosure.

Aspects and implementations of the present disclosure are directed to segmentation visualization, configuration, simulation, or a combination thereof. The systems and methods disclosed can be employed with respect to network security, among other fields. More particularly, it can be appreciated that devices with vulnerabilities are a significant and growing problem. At the same time, the proliferation of network-connected devices (e.g., internet of things (IoT) devices such as televisions, security cameras, wearable devices, medical devices, etc.) can make it difficult to effectively ensure that network security is maintained. Accordingly, described herein in various implementations are systems, methods, techniques, and related technologies, which allows segmentation visualization, configuration, simulation, or a combination thereof and facilitate segmentation configuration to dynamically segment one or more networks so that compromised device communication can be limited (e.g., to small portion of the network) to ensure that the impact of the compromised device is reduced and one or more actions can be taken.

Network segmentation can be used to enforce security policies on a network, for instance in large and medium organizations, by restricting portions or areas of a network which a device can access or communicate with. Segmentation or "zoning" can provide effective controls to limit movement across the network (e.g., by a hacker or malicious software). Enforcement points including firewalls, routers, switches, cloud infrastructure, other network devices, etc., may be used to enforce segmentation on a network (and different address subnets may be used for each segment). Enforcement points may enforce segmentation by filtering or dropping packets according to the network segmentation policies/rules. The viability of a network segmentation project depends on the quality of visibility the organization has into its devices and the traffic flowing between the devices.

Historically, networks were planned and architected in a static manner, meaning each type of user, device, or application on the network has its own range of IP addresses. In addition, networks were historically flat due to ongoing connectivity of users and that made segmentation a very hard project to execute. Even when subnets were used, the IP addresses and roles were statically mapped (e.g., 10.10.10.0/24 mapped to servers). This methodology served network engineers well for the last 20 years. Traditionally networks were segmented or built statically and hierarchically and static segmentation tools were used. Each environment or subnet on the network would have its own functionality. In other words, the segment that a device is part of is based on the IP address of the device. Segmentation done on an IP address basis is fixed or static in manner and is based on more traditional network topologies or organization of devices. Based on the functionality of that static segment, there would be defined segmentation rules that are usually done with static access control lists (ACLs) on routers or firewalls. There is little to no opportunity to be dynamic with the segmentation under such as static policy.

The efficiency and functionality of this model has been challenged in the past several years by the trends of bring your own device (BYOD), internet of things (IoT), virtualization, and elasticity. Further, the mobility of users and devices presents a major challenge for corporate networks to provide efficiency and functionality while being secure. Traditional segmentation methodologies are not well suited for the elasticity in the number of devices and types of devices.

With BYOD, a user is allowed to bring his or her own device onto a network (e.g., a corporate network), and with IoT, the number and type of devices on a corporate network, which used to be predictable and contained, is now unpredictable and exponentially growing. BYOD results in a highly dynamic number of devices. IoT has led to a dramatic rise in the number of devices as well as the variety of devices. The rapid increase in IoT devices is growing and segmentation is one of the most efficient ways to contain the threat of a compromise of IoT devices and reduce the attack surface around IoT devices. Pre-defined IP ranges can no longer accommodate the needs, as in most cases there is no way to accurately predict the number of devices of each type that will appear on the network. In addition, it is very hard to segment an existing flat network from scratch as such a procedure can be disruptive to an organization.

With virtualization and the large increase in elasticity, entities or systems on the network are no longer static physical boxes that sit in the data center or other locations. Desktops and servers are increasingly shifting to a virtual, dynamic, and completely elastic model. This means that it is very difficult to determine an application, device type, or user from its IP address because a virtual server or desktop can appear in two different continents within a day with different IP addresses (while being seamless to an end user).

For example, a zone with a development server may need to be accessible by a group of research and development (R&D) users. The rapid increase in the number of devices and types of devices causes the defining of the large zone of characteristic functionality to no longer scale. Smaller zones could be used but then the network would be more flat and less structured with specific subnets. This becomes particularly problematic when internet protocol version 4 (IPv4) is used because as the number of devices increases the number of available addresses quickly runs out. The more IPv4 devices you have, the more IPv6, which has a larger address space, is needed, and IPv6 has its own implementation challenges.

Segmentation is often done by applying a tag to a device based on the IP scheme. The determination and application of tags to devices is manual. The manual nature of the tagging limits the effectiveness of the segmentation and in some cases even the viability of a segmentation project. For example, a segmentation scheme may indicate that devices in a 10.10.10.x subnet are application servers and thus each server with an IP address in the 10.10.10.x subnet is assigned an application tag. The tags are thus statically mapped to a device based on IP address.

If a device is assigned a tag based solely on the IP address and if the IP address does not match the segmentation scheme, then a device may be tagged with a tag that does not properly match the segmentation scheme. For example, if a printer gets an IP address that is associated with an IP camera segment, then the printer may be restricted from operating properly by being prevented from communicating with devices such as laptops and desktops.

Security products intended to keep networks safe and secure can no longer rely on static IP address schemes as in the last 20 years. Decisions and actions stemming from these products are gradually becoming irrelevant and misleading. Thus, what is needed are granular, adaptive, and flexible solutions that are agnostic to the IP addressing scheme.

An entity or entities, as discussed herein, include devices (e.g., computer systems, for instance laptops, desktops, servers, mobile devices, IoT devices, OT devices, etc.), endpoints, virtual machines, services, serverless services (e.g., cloud based services), containers (e.g., user-space instances that work with an operating system featuring a kernel that allows the existence of multiple isolated user-space instances), cloud based storage, accounts, and users. Depending on the entity, an entity may have an IP address (e.g., a device) or may be without an IP address (e.g., a serverless service). Embodiments are able to dynamically segment various entities, as described herein.

Using current segmentation products in the market results in a segmentation policy that is usually flat which results in large and cumbersome rulesets with various rules and exceptions that need to be manually micromanaged by multiple users (e.g., multiple engineers) or by third party software. In addition, due to the structure of the existing segmentation policy, which is usually a long list of table form rules, it is very difficult to properly figure out the end result upon evaluation of the whole segmentation policy evaluation.

In other words, given a large number of rules with a wide variety of rules, it can be difficult to determine a result of the application of the large number of rules. The rules are typically created for each and every entity which can be a subnet or an IP. For example, with rules spread across two different firewalls, it can be difficult to understand how the rules of one firewall will interact with the rules of the other firewall. The defining of rules that are consistent across different enforcement points that work consistently with the segmentation policy can thus be quite challenging.

Precedence is important because one rule can override another rule. Segmentation rule precedence is determined by the order of the rules, which further complicates the management of the segmentation policies. For example, with a result of thousands of rules, it can quickly become challenging to determine how the rules apply and if the rules are designed as intended and ordered as intended. The difficulty in knowing the result of evaluating the rules means that it can be difficult to know if two devices are able to communicate, which means allowed communications could be blocked and unwanted communications could be allowed.

A segmentation policy, in accordance with embodiments, can include a variety of rules for a variety of entities (e.g., users, devices, locations, etc.). The rules can be applied or configured on one or more enforcement points (e.g., a switch, a firewall, virtual network infrastructure, cloud network infrastructure, etc.).

Embodiments are operable for visual management and configuration of one or more segmentation policies across one or more networks. Embodiments further support simulation of one or more segmentation policies based real time, past network traffic, or a combination thereof. Embodiments may have functionality for dynamic tagging of entities based on characteristics of each entity (e.g., tagging independent of the IP address associated with an entity or device). For example, the tagging may be performed based on an identification, classification, categorization (e.g., type of user or type of service), source and destination connections, or a combination thereof. The source and destination connections may have associated characteristics including or be defined by user, application, device type, location, etc. The tagging may be dynamically determined in an agentless manner and multiple tags may be assigned to an entity. The tags maybe assigned as described in U.S. patent application Ser. No. 16/023,284, and entitled "DYNAMIC SEGMENTATION MANAGEMENT," with filing date Jun. 29, 2018, and is hereby incorporated by reference in its entirety. Embodiments may also support manually tagged entities or devices.

Embodiments provide for a hierarchical management of segmentation policy of multiple entities thereby alleviating the problems of having to manage a large number of rules where there is a separate rule or rules for each entity. The hierarchical organization simplifies segmentation thereby avoiding the problem of having so many rules and so many policies that span across different enforcement points (e.g., firewalls and ACLs), that it is difficult to understand the overall segmentation strategy. Embodiments thus provide visibility and management of the results of the overall segmentation policy thereby allowing a user to easily determine whether two entities can communicate or not.

For example, a firewall could have 15,000 rules which can make it very difficult to understand the results of the rules based on the precedence of the rules and the large quantity of rules on just that firewall alone. The situation becomes even more complicated when another enforcement point has 15,000 rules, and the communications through the two devices need to be considered.

Embodiments further provide for simulation of segmentation rules and policies across various technologies of various enforcement points. Traffic can be recorded or stored along with how the segmentation policy would apply to the traffic and the impact of the segmentation policy displayed, stored, or a combination thereof. The monitoring (and storing) of traffic across multiple devices across one or more networks along with determination of application of the segmentation policy to the monitored traffic allows for the impact of one or more segmentation policies to be determined and presented to a user. For example, an enforcement point can be put into monitor mode so that traffic can be monitored in conjunction with how the segmentation policy will apply. Embodiments may further include traffic visualization functionality that assists in mapping of the baseline traffic and automating rule creation based on the baseline traffic. Embodiments thus allow for validating, monitoring, or simulating one or more segmentation policies across different technologies.

In some embodiments, when simulating a segmentation policy, if traffic violates simulated segmentation rule, per a user setting, embodiments may react in real time and block the entity sending the traffic (e.g., by change the VLAN of the entity or quarantining the entity).

In some embodiments, entity communication and associated segmentation policies are displayed in a hierarchical manner. The use of hierarchical segmentation policy ruleset allows granular and complicated exception configuration to meet the needs of an organization's dynamic networks. The use of a hierarchical display and the associated nested rules of the segmentation policy will help users (e.g., operators, administrators, etc.) avoid creating thousands of flat segmentation rules with pre-defined precedency (e.g., creating rules individually and for each combination of tags). The hierarchical organization assists in defining and shifting between a high level organizational segmentation policy based on characteristics, e.g., device role, role of and a detailed policy based on location/compliance/connection type, etc. The hierarchical representation enables easy understanding of what is the high level segmentation policy based on device types and then allowing viewing (e.g., drilling down or expanding a matrix) of how each device based on characteristics can communicate with other devices with different characteristics.

The visualization of one or more rulesets of one or more segmentation policies may be displayed as a matrix that provides insight into how different rules will influence traffic between different (dynamic) network portions (e.g., that a user has defined). The matrix visually represents different types of errors and violations between entity groups thereby enabling a user to respond and obtain insights into policy accuracy and strictness (e.g., in real time). In other words, the visual representation of different types of errors and violations (e.g., based on simulation or enforcement monitoring) will help a user respond and obtain insights on a segmentation policy in real time. In some embodiments, source groups may be along a first axis or side of a matrix and destination groups may be along a second axis or side of a matrix. The inspections of the rows and columns of the source and destination groups may have an indicator of which communications, if any, are allowed between the source and destination groups at the intersection. When a policy ruleset is written and a rule is created, indications (e.g., graphically, text, etc.) are presented (e.g., displayed) to provide assistance for facilitating understanding how the rule will influence the traffic on a network by visualizing the impact of one or more rules as applied to traffic between two groups at an intersection of the matrix. The matrix can also visually represent different types of errors and violations that will help a user respond and obtains insights on the segmentation policy accuracy and strictness in real time.

For example, if a matrix is displayed which multiple destination and source groups, one or more printer groups may be in the source group and a camera group may be in the destination, if there is a rule that says printers to cameras allow all traffic, then as soon as the rule is created, a green indicator (e.g., circle, square, tile, flashing shape, etc.) may be displayed on the matrix at the interception point of the two groups to show that the two groups can communicate on each port. The green thus indicates that the rule influences traffic between printers and cameras groups and it allows any traffic between printers and cameras.

As another example, if the rule was printers to camera deny, then a red indicator (e.g. circle, square, tile, flashing shape, etc.) may be displayed between the printers group and the cameras group at the intersection of the groups in the matrix. This would help a user understand that there is a rule denying traffic between the two groups.

In the case where particular traffic is allowed and other traffic is denied, this situation can be communicated with an orange (or yellow) indicator (e.g. circle, square, tile, flashing shape, etc.) at the intersection on the matrix between the two groups. For example, the orange indicator helps a user understand that the rule just created is blocking certain traffic while allowing other traffic between a printers group and a cameras group.

Embodiments can thus visualize the segmentation policy on the matrix to assist a user in understanding the influences and the dependency between the various groups. It is appreciated that other colors than those described herein and different shades may be used in place of different colors. Embodiments further support other ways of displaying information besides the matrixes and hierarchies described herein. For example, other structures or graphical user interface elements, multi-dimensional arrays, or formats may be used in place of the aforementioned matrix.

Embodiments support multiple policies and different traffic visualization grids that allow a user to gain insights on network traffic from various perspectives or characteristics (e.g., a location based matrix, compliance based matrix, etc.) and eases definition of dedicated policies for each environment (e.g., campus, IoT, data center, cloud, and OT). Particular matrixes may thus be presented for each environment (e.g., with various location groups, compliance based groups, device type based groups, etc.) thereby depicting the impact of various policy sets in different environments. The matrixes allow visualization of traffic between various groups in various different environments and allows creation of different rule sets for each environment. This eases the managing of network segmentation for each environment, entity group, or combination thereof. For example, a compliance matrix may thus be used to view and select one or more groups, and then modify compliance segmentation rules without or independent of other segmentation rules (e.g., location associated segmentation rules).

As another example, there may be a campus matrix, an IoT matrix, a data center and cloud matrix, and an OT matrix. Different types of devices, user, or entities can be depicted as groups and further as source and destination groups. For the campus environment, printers, users, and camera groups may be shown. For the data centers and cloud environment, traffic between users in the campus and servers in the data center, traffic between web servers and database servers, and traffic between application servers and webservers may be shown. For the OT environments, programmable logic controller (PLC), human interface machines (HMI), production floor centers, and other groups relevant to OT environments may be shown. The visual display of traffic between such groups allows getting insights into traffic between those specific groups. The specific policy rule sets may then be written or configured for those groups by selecting the intersection between the two groups on the matrix and the rules governing communication between the two groups configured (e.g., via a GUI presented upon the selection of the intersection). The matrix can further be used to configuration of the traffic that is to be monitored or collected for simulating one or more segmentation policies. Ease of use and intuitiveness around the policy visualization and workflow and allows network administrators to control segmentation with confidence.

Embodiments are able to function as a manager of segmentation products so that segmentation products can be managed in an intelligent and efficient manner. Embodiments may thus augment other segmentation products, e.g., enforcement points, by enabling easy control, management, and configuration across multiple enforcement points including enforcement points from a variety of vendors or manufacturers. Embodiments may also supplant the need to purchase products that are designed to assist in the result determinations of multiple rules. The hierarchy and visualization of the policy along with the simulation of segmentation policies on various segmentation technologies advantageously allow for unparalleled ease of segmentation management and ease.

Embodiments allow for management of heterogeneous segmentation products support any vendor, any technology on any network and automate segmentation management across the network. Embodiments make segmentation products operate better by managing the segmentation from a high level perspective and pushing segmentation policy changes out to each enforcement point on a network.

For example, embodiments simplify segmentation management in environments with IoT devices which allows for an efficient solution for containing the threat that IoT devices present and reduces that attack surface around it. The lack of the possibility of deploying an agent on most IoT devices makes segmentation the choice to proactively contain IoT based threats in a specific environment so the risk does not spread further on the network. Further, embodiments provide an efficient way to mitigate ransomware attacks, which are becoming more prevalent.

Accordingly, described herein in various implementations are systems, methods, techniques, and related technologies, which may perform segmentation visualization, configuration, simulation, or a combination thereof. As described herein, various techniques can be used to manage and simulate one or more segmentation policies based on various entity characteristics.

It can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

FIG. 1 depicts an illustrative communication network 100, in accordance with one implementation of the present disclosure. The communication network 100 includes a network monitor device 102, a network device 104, an aggregation device 106, a system 150, devices 120 and 130, and network coupled devices 122*a-b*. The devices 120 and 130 and network coupled devices 122*a-b* may be any of a variety of devices including, but not limited to, computing systems, laptops, smartphones, servers, Internet of Things (IoT) or smart devices, supervisory control and data acquisition (SCADA) devices, operational technology (OT) devices, campus devices, data center devices, edge devices, etc. It is noted that the devices of communication network 100 may communicate in a variety of ways including wired and wireless connections and may use one or more of a variety of protocols.

Network device 104 may be one or more network devices configured to facilitate communication among aggregation device 106, system 150, network monitor device 102, devices 120 and 130, and network coupled devices 122*a-b*. Network device 104 may be one or more network switches, access points, routers, firewalls, hubs, etc.

Network monitor device 102 may use tags assigned to entities or devices based on classification, identification, characteristics, etc. The tags maybe assigned as described in U.S. patent application Ser. No. 16/023,284, and entitled "DYNAMIC SEGMENTATION MANAGEMENT," with filing date Jun. 29, 2018, and is hereby incorporated by reference in its entirety.

Network monitor device 102 may be operable for a variety of tasks including segmentation management including visualization, configuration, simulation, or a combination thereof, as described herein. The segmentation management may be based on a segmentation policy and network monitor device 102 determines and implements the segmentation of the network (e.g., based on assigning one or more tags to each entity) based on the segmentation policy. Network monitor 102 may implement the segmentation policy by configuring one or more enforcement points (e.g., network device 104, firewalls 202-206, etc.) by using commands specific to the one or more enforcement points (e.g., using APIs, CLI commands, etc.).

Network monitor device 102 may further be able to store network traffic (e.g., received from network device 104, firewalls 202-206, etc.) which may then be used to simulate existing segmentation rules or simulate proposed or segmentation rules that are not implemented or configured on the network (e.g., on the enforcement points). In some embodiments, network monitor device 102 is operable to perform visualization and aggregation of traffic overtime of traffic flows to and from devices, users, services, etc., in different parts of one or more networks (e.g., across the extended enterprise) based on grouping.

Network monitor device 102 may support multiple segmentation policies and visualization grids (e.g., matrixes). For example, there may be matrixes for each environment of a network (e.g., an OT matrix, a campus matrix, a data center matrix, a cloud matrix, etc.). The matrixes may be displayed on respective tabs for each environment with the matrix of each tab indicating whether communication is allowed between various groups of the environment. Embodiments also support a single matrix for one or more network (e.g., across an enterprise).

Network monitor device 102 may be configured to determine and display a high level segmentation policy structure (e.g., in the form of a matrix) to enable visualization of the segmentation policy ruleset(s) in a hierarchical manner. The hierarchy can be used to select groups and configure segmentation rules of entities in the group, as described herein (e.g., FIGS. 4-8). In some embodiments, network monitor device 102 is operable to display one or more segmentation policies as a hierarchical segmentation policy ruleset(s) based on multi-axis categorization of one or more entities on the network. The hierarchical display of the segmentation policy ruleset(s) allows viewing rules and entities at a high level and then selecting one or more entity groups to view subgroups or individual entities and associated rules. The hierarchy may be based on tags of an entities which are based on various verticals or various characteristics (e.g., location, compliance, connection point, risk, other categories, etc.). The hierarchy of the entity groups may be based on groups of tags or tags of tags which may be displayed. Embodiments are able to accumulate multiple characteristics based on various properties or pillars (e.g., compliance, location, risk, etc.) and sets or groups of multiple characteristics can be categorized with the hierarchy built or determined based on the categories. Network traffic can then be visualized based on the hierarchy (e.g., between the various groups).

For example, a matrix with 20 destination groups and 20 source groups may be displayed which shows how the different groups can communication with each other. The hierarchy may show various aspects at a high level, e.g., devices that are compliant, connected to a switch or wireless access points, have high risk, or are located in France or Germany. Particular details of individual entities can be hidden in the hierarchy under device type.

As another example, if there is a device type group of printers selected from the matrix, this group may include printers in Germany and France and each location can be compliant or non-compliant. Per each location, if a printer is complaint, connected to a switch or wireless access point can be used to determine whether a device is high risk or low risk, each of which can be shown in a hierarchy.

The various levels of the hierarchy can be broken down or drilled down based on different characteristics. Referring to the above example, each location of printers can be viewed along with the compliance of groups of printers at each location. Each compliance state of each printer location group can be broken down by risk based on how the device is connected to the network (e.g., printers connected to network via a switch are trusted more thereby having lower risk while printers connected via a VPN are trusted less thereby having a higher risk). The hierarchy can thus hide or obscure details (e.g., tags of tags of tags) while still allowing access to view each level if so desired.

Embodiments can show or display traffic between the various hierarchies (e.g., of groups), which allows the creation of granular segmentation rules based on different tags in the hierarchy. For example, a specific segmentation policy can be written for one or more printers located in France that are compliant and connected to a switch, then using the hierarchy writing a different policy for printers located in Germany that are connected to a switch and that are compliant, then using a different portion of the hierarchy to write or configure a policy for printers that are connected to a switch, that are compliant, but have high risk.

Embodiments are thus able to present insight on traffic between hierarchal groups and enable creation of hierarchical policy sets to define segmentation of particular devices or entities with multiple enforcement points. Embodiments thus overcome the limitations of prior methodologies which require rules to be defined for each permutation of device and characteristic combinations.

Embodiments are able to hide the complexity of a segmentation policy in the hierarchy. For example, a user can select communications between printers and cameras and then drill down to configure a rule that a printer that is connected to a switch can talk to a camera that is connected to a switch and nothing else. As another example, a rule may be configured for printers that are connected to a switch, that are compliant, can talk to cameras that are connected to a switch that are compliant are able to communicate. Each hierarchy level (or group or subgroup) can define or describe the various states that an entity can be in (e.g., location, connection point (switch, wireless, access point, etc.), compliance, risk, etc.). The traffic can be presented for each of the different states, or combination thereof, and allow creation of rules for each of the groups in the hierarchy. The traffic can be visualized between the hierarchies which are defined based on the various characteristics of embodiments (e.g., network device 102) are able to determine about each entity. The entities may be categorized based on various multiple characteristics which are then used to create the hierarchy based on those characteristics.

The hierarchy may be displayed based on user selection or user configuration. A user may thus select how the hierarchy is created (e.g., by selecting a high level group such as location or device type) and then drill down to other characteristics (e.g., compliance and risk) or subgroups. For example, the hierarchy can be based on location groups and then allow drilling down to connection points, compliance state, and device types. Or the hierarchy can be based on device type and then allow drilling down to location, compliance state, and risk.

Prior methodologies were based on having a unique tag for each permutation of devices. For example, if you had a tag for devices of a vice president level employees and another tag for devices of product manager level employees, then a third tag was needed for each device that was associated with devices of employees who are a vice president level product managers. This results in the number of tags exponentially growing with the number of devices.

Embodiments support dynamic tags that can be used to tag entities based on multiple characteristics, without creating a unique tag for each set and every combination of characteristics. In contrast, some embodiments do not create a tag for each combination of device characteristics, rather embodiments create a hierarchy (e.g., a group in the hierarchy) for each characteristic of entities of the network. Advantageously, embodiments do not overload the policy visualization interface (e.g., GUI with a matrix or a hierarchy) with each unique combination of entity characteristics. The unique combinations of each group may be hidden initially and then accessed as the hierarchy is traversed or drilled down (e.g., a user navigates down the hierarchy). The use of the hierarchy thus can hide the complexity from the user, allow tagging of entities based on different characteristics, without the need for creation of a new tag for every combination of characteristics.

Network monitor device 102 further may support a simulation or monitor mode that allows testing of one or more segmentation rules using recorded, stored, real-time network traffic (e.g., traffic that has been observed on the network), or a combination thereof. Network monitor device 102 thereby allows segmentation policy planning based on visualization of network traffic. Network monitor device 102 allows visualization of network traffic patterns over time between various entities across and within one or more parts of a network (e.g., including cloud, data center, OT, and IT). Network device 102 allows monitoring of current or recent network traffic, stored or historical network traffic, or a combination thereof and depicting the network traffic visually (e.g., as related to one or more segmentation policies). Network device 102 enables visualization and segmentation policy simulation by visualizing enforcement logging and violation (e.g., of segmentation policies). For example, network monitor device 102 may display a first indicator (e.g., orange icon) when rule enforcement would be performed in the simulation and a second indicator (e.g., red icon) for violations of a simulated segmentation policy (e.g., when traffic that would violate the simulated segmentation policy is observed on the network.

In some embodiments, network monitor device 102 stores network traffic (e.g., from multiple network devices including enforcement points, which may include as network device 104) in a data structure that is used to mimic the behavior of each of the devices in the network based on the segmentation rules being simulated. Embodiments can then show visually how traffic is flowing in the network (e.g., between groups or on an enforcement point basis) and indicate any possible issues.

Embodiments may detect when segmentation rules are not implemented as a user intended. For example, if a segmentation rule says that research and development (R&D) devices can communicate with printers on port 80 and the rule is simulated, if network traffic is found to include network traffic of R&D devices communicating with printer on port 90, this can be indicated as a violation because the rule only allows for R&D devices to communicate with the printers on port 80. This can be visualized as a violation in the matrix (e.g., with a visual indicator). A user may then decide how to deal with the violation. The violation can then be selected and the rule modified (e.g., to whitelist the observed network traffic) or the violation cleared (e.g., marked as reviewed). In some embodiments, the segmentation rules may automatically be modified to remove any violations thereby configuring the segmentation rules based on network traffic.

Embodiments may also report violations or attempted communications based on simulated rule(s) and actual network traffic over time. For example, if network traffic was observed for a period of a week and R&D devices were observed communicating with printers on port 80, the simulated rules would be marked without a violation. However, as more traffic was monitored over time, the network traffic may include R&D devices communicating with printers on port 90 legitimately which would be identified and visually depicted as a violation of the rule. This communication can be whitelisted and the segmentation rule(s) be updated.

Embodiments are able to help a user understand the impact if one or more segmentation rules that are being simulated were implemented. Referring to the above example, the simulation of the segmentation rule that R&D communication with printers is allowed on port 80 but no other ports and the corresponding indicated violation means that implementing the rule could be disruptive to R&D devices (and users) because the communications with printers on port 90 would be blocked. Embodiments thus enable a cautious approach to implementation of segmentation rules to allow for minimal disruption of network communication, while still granularly tailoring a secure segmentation policy. Embodiments support selection of a single segmentation rule or multiple segmentation rules among many segmentation rules for simulation, implementation, or combination thereof.

Embodiments thus support putting a whole segmentation policy into simulation and monitoring for and indicating any violations of the segmentation policy. This allows review of the segmentation rules on a rule by rule basis to see if there are any violations and whether or not the rule should be modified to allow the traffic that was observed.

Segmentation rules can be selected from the simulation or monitor mode for implementation on one or more enforcement points (e.g., by network monitor device 102 configuring the one or more enforcement points) thereby enabling transition from testing or simulation to implementation. Embodiments support both simulation and implementation of segmentation policies and rules across multiple enforcement points types (e.g., vendors, technologies, device types, etc.). For example, the details of whether a firewall, router, or switch is used (and the associated specific commands) to implement a segmentation policy can be hidden from a user. The enforcement points may be configured using an application programming interface (API), command line interface (CLI), a simple network management protocol (SNMP) interface, or a combination thereof. In some embodiments, the segmentation management is performed without an agent installed on the entity or device.

Network monitor device 102 may further perform a variety of functions including identification, classification, and taking one or more remediation actions (e.g., changing network access of the entity, change the virtual local area network (VLAN), send an email, short message service (SMS), etc.). Entity identification, classification, or combination thereof may be used to determine one or more tags to be associated with the entity which in turn are used to facilitate segmentation visualization, configuration, and simulation, as described herein.

An enforcement point may be a router, firewall, switch, hypervisor, software-defined networking (SDN) controller, virtual firewall, or other network device or infrastructure that may have an ACL like policy to apply based on the IP of an entity. Enforcements points may also be a next generation firewall (NGFW) and cloud infrastructure. A NGFW can be updated with an ACL like policy regarding an entity accessing the Internet. Cloud infrastructure (e.g., amazon web services (AWS) security groups) can be updated to drop packets from the IP of the entity that have a destination outside the cloud. Three different enforcement actions (e.g., a router ACL, a NGFW ACL, and a cloud infrastructure security group packet filtering ACL) can thus be applied to three different enforcement points (e.g., a router, a NGFW, and cloud infrastructure). Enforcement actions can be applied in each tier (e.g., campus enforcement points, data center enforcement points, cloud enforcement points) across different network tiers.

In some embodiments, if the categorization functionality is being updated (e.g., which could result in a change in one or more tags that are assigned to an entity and thus impact the enforcement of segmentation by the enforcement points), notifications may be sent (e.g., via email or other methods as described herein) or presented to a user (e.g., via a graphical user interface (GUI)) to indicate that the categorization of one or more entities is changing and should be confirmed before enforcement points are updated based on the changed categorization. After conformation, the tags may be changed. The notifications may also be displayed in a GUI including the matrixes or hierarchies, as described herein.

The segmentation management can include accessing a plurality of segmentation rules, determining one or more characteristics of a plurality of entities communicatively coupled to a network, determining a plurality of groups based on at least one characteristic of the one or more characteristics, wherein each group comprises at least one entity of the plurality of entities, selecting a first group and a second group from the plurality of groups, determining one or more segmentation rules associated with the first group, determining one or more segmentation rules associated with the second group, determining communication properties between the first group and second group, and displaying an indication of the communication properties between the first group and the second group.

Network monitor device 102 may be a computing system, network device (e.g., router, firewall, an access point), network access control (NAC) device, intrusion prevention system (IPS), intrusion detection system (IDS), deception device, cloud-based device, virtual machine based system, etc. Network monitor device 102 may be communicatively coupled to the network device 104 in such a way as to receive network traffic flowing through the network device 104 (e.g., port mirroring, sniffing, acting as a proxy, passive monitoring, etc.). In some embodiments, network monitor device 102 may include one or more of the aforementioned devices. In various embodiments, network monitor device 102 may further support high availability and disaster recovery (e.g., via one or more redundant devices).

In some embodiments, network monitor device 102 may monitor a variety of protocols (e.g., Samba, hypertext transfer protocol (HTTP), secure shell (SSH), file transfer protocol (FTP), transfer control protocol/internet protocol (TCP/IP), user datagram protocol (UDP), Telnet, HTTP over secure sockets layer/transport layer security (SSL/TLS), server message block (SMB), point-to-point protocol (PPP), remote desktop protocol (RDP), windows management instrumentation (WMI), windows remote management (WinRM), etc.).

The monitoring of entities by network monitor device 102 may be based on a combination of one or more pieces of information including traffic analysis, information from external or remote systems (e.g., system 150), communication (e.g., querying) with an aggregation device (e.g., aggregation device 106), and querying the entity itself (e.g., via an API, CLI, or web interface), which are described further herein. Network monitor device 102 may be operable to use one or more APIs to communicate with aggregation device 106, device 120, device 130, or system 150. Network monitor device 102 may monitor for or scan for entities that are communicatively coupled to a network via a NAT device (e.g., firewall, router, etc.) dynamically, periodically, or a combination thereof.

Information from one or more external or 3rd party systems (e.g., system 150) may further be used for determining one or more tags for an entity. For example, a vulnerability assessment (VA) system may be queried to verify or check if an entity is in compliance and provide that information to network monitor device 102. External or 3rd party systems may also be used to perform a scan or a check on an entity to determine a software version.

Device 130 can include agent 140. The agent 140 may be a hardware component, software component, or some combination thereof configured to gather information associated with device 130 and send that information to network monitor device 102. The information can include the operating system, version, patch level, firmware version, serial number, vendor (e.g., manufacturer), model, asset tag, software executing on an entity (e.g., anti-virus software, malware detection software, office applications, web browser(s), communication applications, etc.), services that are active or configured on the entity, ports that are open or that the entity is configured to communicate with (e.g., associated with services running on the entity), media access control (MAC) address, processor utilization, unique identifiers, computer name, account access activity, etc. The agent 140 may be configured to provide different levels and pieces of information based on device 130 and the information available to agent 140 from device 130. Agent 140 may be able to store logs of information associated with device 130. Network monitor device 102 may utilize agent information from the agent 140. While network monitor device 102 may be able to receive information from agent 140, installation or execution of agent 140 on many entities may not be possible, e.g., IoT or smart devices.

System 150 may be one or more external, remote, or third party systems (e.g., separate) from network monitor device 102 and may have information about devices 120 and 130 and network coupled devices **122*a-b*. System 150 may include a vulnerability assessment (VA) system, a threat detection (TD) system, endpoint management system, a mobile device management (MDM) system, a firewall (FW) system, a switch system, an access point system, etc. Network monitor device 102 may be configured to communicate with system 150 to obtain information about devices 120 and 130 and network coupled devices 122*a-b* on a periodic basis, as described herein. For example, system 150 may be a vulnerability assessment system configured to determine if device 120** has a computer virus or other indicator of compromise (IOC).

The vulnerability assessment (VA) system may be configured to identify, quantify, and prioritize (e.g., rank) the vulnerabilities of an entity. The VA system may be able to catalog assets and capabilities or resources of an entity, assign a quantifiable value (or at least rank order) and importance to the resources, and identify the vulnerabilities or potential threats of each resource. The VA system may provide the aforementioned information for use by network monitor device 102.

The advanced threat detection (ATD) or threat detection (TD) system may be configured to examine communications that other security controls have allowed to pass. The ATD system may provide information about an entity including, but not limited to, source reputation, executable analysis, and threat-level protocols analysis. The ATD system may thus report if a suspicious file has been downloaded to a device being monitored by network monitor device 102.

Endpoint management systems can include anti-virus systems (e.g., servers, cloud based systems, etc.), next-generation antivirus (NGAV) systems, endpoint detection and response (EDR) software or systems (e.g., software that record endpoint-system-level behaviors and events), compliance monitoring software (e.g., checking frequently for compliance).

The mobile device management (MDM) system may be configured for administration of mobile devices, e.g., smartphones, tablet computers, laptops, and desktop computers. The MDM system may provide information about mobile devices managed by MDM system including operating system, applications (e.g., running, present, or both), data, and configuration settings of the mobile devices and activity monitoring. The MDM system may be used get detailed mobile device information which can then be used for device monitoring (e.g., including device communications) by network monitor device 102.

The firewall (FW) system may be configured to monitor and control incoming and outgoing network traffic (e.g., based on security rules). The FW system may provide information about an entity being monitored including attempts to violate security rules (e.g., unpermitted account access across segments) and network traffic of the entity being monitored.

The switch or access point (AP) system may be any of a variety of network devices (e.g., network device 104 or aggregation device 106) including a network switch or an access point, e.g., a wireless access point, or combination thereof that is configured to provide an entity access to a network. For example, the switch or AP system may provide MAC address information, address resolution protocol (ARP) table information, device naming information, traffic data, etc., to network monitor device 102 which may be used to monitor entities and control network access of one or more entities. The switch or AP system may have one or more interfaces for communicating with IoT or smart devices or other devices (e.g., ZigBee™, Bluetooth™, etc.), as described herein. The VA system, ATD system, and FW system may thus be accessed to get vulnerabilities, threats, and user information of an entity being monitored in real-time which can then be used to determine a risk level of the entity.

Aggregation device 106 may be configured to communicate with network coupled devices 122*a-b* and provide network access to network coupled devices 122*a-b*. Aggregation device 106 may further be configured to provide information (e.g., operating system, entity software information, entity software versions, entity names, application present, running, or both, vulnerabilities, patch level, etc.) to network monitor device 102 about the network coupled devices 122*a-b*. Aggregation device 106 may be a wireless access point that is configured to communicate with a wide variety of devices through multiple technology standards or protocols including, but not limited to, Bluetooth™, Wi-Fi™, ZigBee™, Radio-frequency identification (RFID), Light Fidelity (Li-Fi), Z-Wave, Thread, Long Term Evolution (LTE), Wi-Fi™ HaLow, HomePlug, Multimedia over Coax Alliance (MoCA), and Ethernet. For example, aggregation device 106 may be coupled to the network device 104 via an Ethernet connection and coupled to network coupled devices 122*a-b* via a wireless connection. Aggregation device 106 may be configured to communicate with network coupled devices 122*a-b* using a standard protocol with proprietary extensions or modifications.

Aggregation device 106 may further provide log information of activity and properties of network coupled devices 122*a-b* to network monitor device 102. It is appreciated that log information may be particularly reliable for stable network environments (e.g., where the types of devices on the network do not change often). The log information may include information of updates of software of network coupled devices 122*a-b*.

Figure 2:
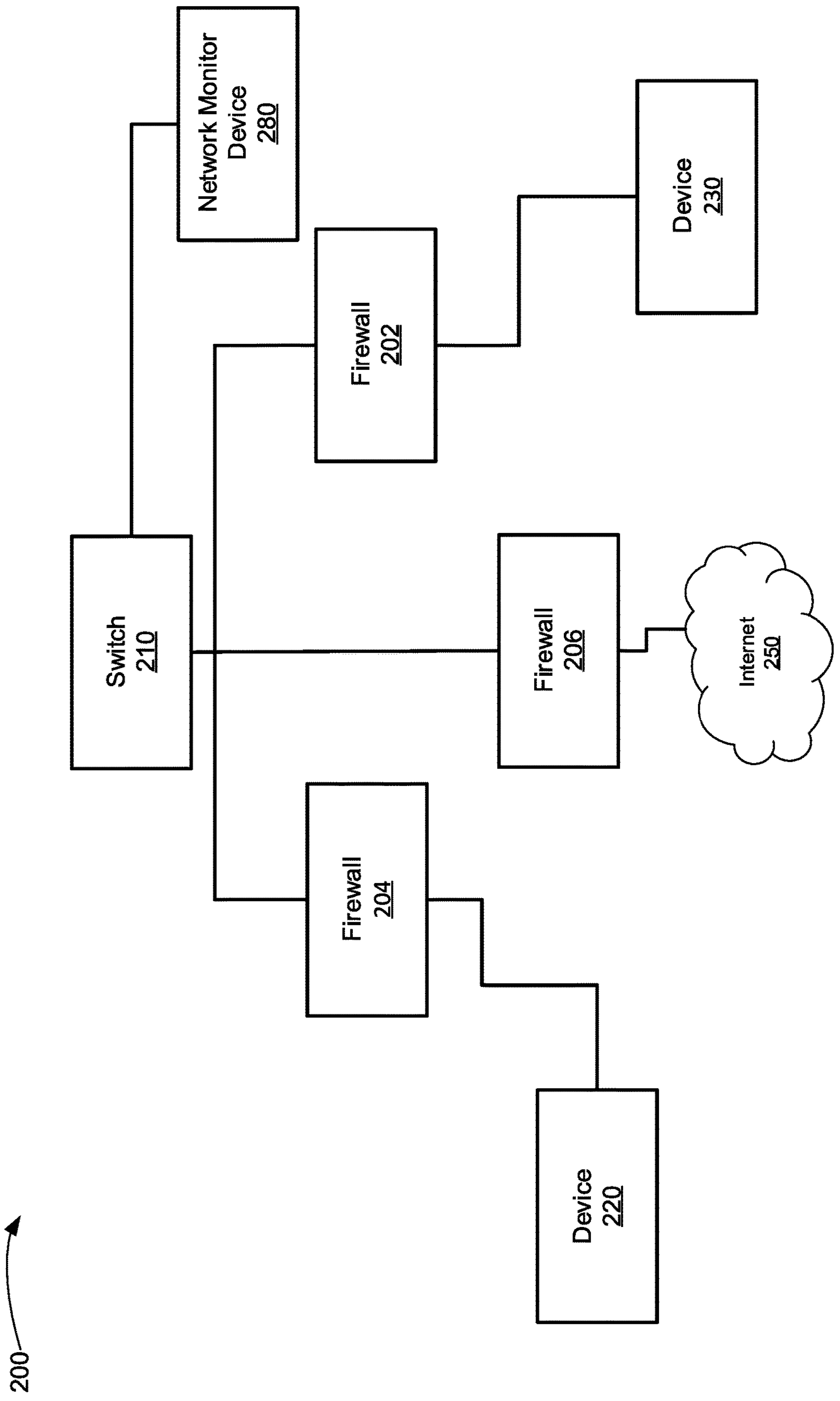
FIG. 2 depicts an illustrative network topology in accordance with one implementation of the present disclosure.

FIG. 2 depicts an illustrative network topology in accordance with one implementation of the present disclosure. FIG. 2 depicts an example network 200 with multiple enforcement points (e.g., Firewalls 202-206 and switch 210) and a network monitor device 280 (e.g., network monitor device 102) which may handle segmentation management, assign one or more tags based on one or more characteristics of an entity, and assign enforcement actions to the enforcement points to implement a segmentation policy. Network monitor device 280 is further configured for visualizing one or more segmentation policies to enable configuration and simulation of the one or more segmentation policies, as described herein.

FIG. 2 shows example network devices 202-230 (e.g., devices 106, 122*a-b*, 120, and 130) and it is appreciated that more or fewer network devices or other entities may be used in place of network devices of FIG. 2. For example, firewalls 202-206 may be any entity (e.g., network device 104, cloud infrastructure, etc.) that is operable to allow traffic to pass, drop packets or restrict traffic. Network monitor device 280 may be any of a variety of network devices, e.g., router, firewall, an access point, network access control (NAC) device, intrusion prevention system (IPS), intrusion detection system (IDS), deception device, cloud-based device, virtual machine based system, etc. Network monitor device 280 may be substantially similar network monitor device 102. Embodiments support IPv4, IPv6, and other addressing schemes. In some embodiments, network monitor device 280 may be communicatively coupled with firewalls 202-206 and switch 210 through additional individual connections (not shown) (e.g., to receive or monitor network traffic through firewalls 202-206 and switch 210).

Switch 210 communicatively couples the devices of network 200 including firewalls 202-206 and network monitor device 280. Firewalls 202-206 may perform network address translation (NAT) and firewalls 202-204 communicatively couple the devices 220-230 which are behind the firewalls. Firewall 206 communicatively couples network 200 to Internet 250 and firewall 206 may restrict or allow access to Internet 250 based on particular rules or ACLs configured on firewall 206. Firewalls 202-206 are thus enforcement points, as described herein.

Network monitor device 280 is configured to identify, classification, determine characteristics of entities (e.g., devices 220-230), or a combination thereof on network 200, as described herein. Network monitor device 280 is configured to determine one or more tags based the characteristics of devices 220-230, as described herein. The tags can include a compliance tag (e.g., whether the entity is in compliance with a policy), a firewall tag (e.g., which resources or areas the entity is permitted to communicate with based on a firewall), a location tag (e.g., the location, for instance fifth floor, or the department, for instance, accounting department), an access control list (ACL) tag (e.g., which resources or areas the entity is permitted to communicate with), a department tag, a user tag (e.g., which user is logged into the entity), or an account tag (e.g., which account(s) are associated with the entity).

Based on the tags, network monitor device 280 is operable to determine a zone based on the tags determined for an entity. For example, if device 230 has an accounting department tag, a California office tag, a second floor tag, a wireless tag, a lab environment tag, the zone may be a wireless California office lab zone.

Based on the zone, network monitor device 280 is operable to determine enforcement points associated with the determined zone. For example, if device 230 is an accounting department device, switch 201 and firewalls 206 and 202 may be determined to be enforcement points associated with the zone determined for device 220.

Network monitor device 280 may further configure enforcement actions on firewalls 204-206 based on the scan of devices of network 200, as described herein. Network monitor device 280, based on the enforcement points, can assign enforcement actions to enforcement points. Referring to the example above, a NGFW configuration action may be assigned to firewall 206 to allow device 230 to access the internet using HTTP ports only. Firewall 202 and switch 210 may be assigned enforcement actions (e.g., ACLs) to allow device 230 to access other accounting resources (e.g., file shares, email servers, application servers, etc.).

Network monitor device 280 is configured to access firewalls 202-206 and switch 210 to access segmentation rules, if any, configured on firewalls 202-206 and switch 210. Based on any accessed segmentation rules, network monitor device 280 can determine one or more segmentation policies configured on network 200. Network monitor device 280 can then visualize the one or more segmentation policies by displaying one or more GUIs (e.g., FIGS. 4-8) which may include matrixes and hierarchies, as described herein.

For example, if device 220 is an IoT device and device 230 is an accounting file server, network monitor device 280 may show an IoT (device) group and an accounting group in a matrix with a visual indicator, as described herein, at the intersection of the groups on the matrix of whether the two groups are able to communicate and the associated communication properties (e.g., whether the groups are able to communicate on certain ports or with certain protocols). Based on a GUI presented by network monitor device 280, a user can then configure one or more rules to limit or block communication between the two groups. Network monitor device 280 may then configure firewalls 202-207 and switch 210 based on the one or more configuration rules.

As another example, network monitor device 280 may graphically present the one or more segmentation policies configured on firewalls 202-206 and switch 210 along with an interface portion of simulation of one or more segmentation policies or rules. A user can then configure one or more proposed segmentation rules which may be simulated. Network monitor device 280 then monitors traffic on firewalls 202-206 and switch 210 to determine an impact of implementing the one or more proposed segmentation rules (e.g., including determining violations, as described herein) and visually presents (e.g., renders or displays) the impact of the proposed one or more segmentation rules. A user may then select through the GUI presented by network monitor device 280 to modify the proposed segmentation rules (e.g., whitelist traffic observed on the network or block additional traffic). The user may further select through the GUI to implement one or more of the proposed segmentation rules. Network monitor device 280 may then configure firewalls 202-206 and switch 220 to implement the one or more proposed segmentation rules.

Figure 3:
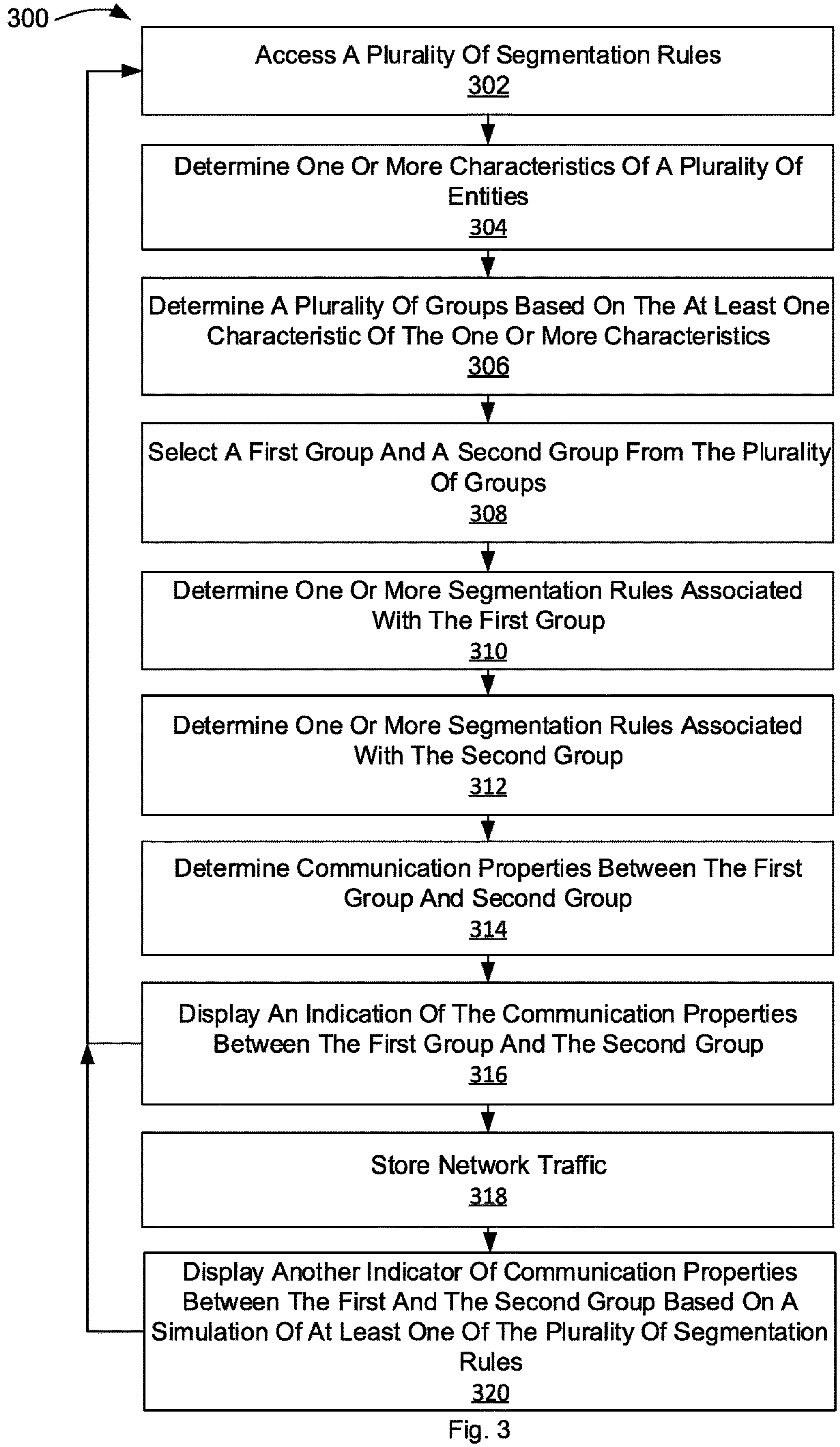
FIG. 3 depicts a flow diagram of aspects of a method for segmentation visualization, configuration, simulation, or a combination thereof in accordance with one implementation of the present disclosure.

With reference to FIG. 3, flowchart 300 illustrates example functions used by various embodiments. Although specific function blocks ("blocks") are disclosed in flowchart 300, such blocks are examples. That is, embodiments are well suited to performing various other blocks or variations of the blocks recited in flowchart 300. It is appreciated that the blocks in flowchart 300 may be performed in an order different than presented, and that not all of the blocks in flowchart 300 may be performed.

FIG. 3 depicts a flow diagram of aspects of a method for segmentation visualization, configuration, simulation, or a combination thereof in accordance with one implementation of the present disclosure. Various portions of flowchart 300 may be performed by different components (e.g., components of system 900) of an entity (e.g., network monitor device 102). Flowchart 300 depicts a process for segmentation visualization, configuration, simulation (e.g., simulated segmentation rules and validation), or a combination thereof.

At block 302, a plurality of segmentation rules are accessed. The plurality of segmentation rules may be part of one or more segmentation policies that may each include one or more segmentation rules and may be configured on one or more enforcement points (e.g., network device 104, firewalls 2020-206, switch 210, etc.) as described herein. The segmentation rules may be accessed from a file (e.g., a segmentation rules template file). In some embodiments, the segment polices are associated with respective environments, e.g., a campus, IoT, data center, cloud, or OT.

At block 304, one or more characteristics of a plurality of entities is determined. The one or more characteristics may be collected or accessed from various of sources including, from the entity, from the environment, network devices (e.g., one or more switches, routers, firewalls, etc.) and any other device or resource communicatively coupled to the network (e.g., network 100) including other systems (e.g., system 150). The one or more characteristics may include classification, identification, categorization, or a combination thereof which may be based on fingerprints, entity behavior, etc., as described herein. Embodiments are able to determine the one or more characteristics of the entity agentlessly thereby allowing characteristics of an entity to be quickly determined for entities that do not have or support an agent as well as without needing an agent to be installed for entities that do support an agent. In some embodiments, the one or more characteristics are determined in real-time.

At block 306, a plurality of groups based on at least one characteristic of the one or more characteristics is determined. The groups may be based on a single characteristics of each entity, as described herein. In some embodiments, some groups of the plurality of groups may be based on multiple characteristics. For example, a first set of devices that are in compliance that are located at a California office may be a group while a second set of devices that are not in compliance that are located at a California office are in another group and both sets of devices are in the California office group. The group may also be based on one or more tags associated with an entity, as described herein.

At block 308, a first group and a second group from the plurality of groups is selected. The first group and the second group may be selected based on user selector or as part of generating a matrix, as described herein. In some embodiments, the first group may be selected as a source communication group and the second group may be selected as a destination communication group (or vice versa).

At block 310, one or more segmentation rules associated with the first group are determined. The determination of the segmentation rules associated with the first group may be based on analyzing the each of segmentation rules that apply to the entities of the first group, as described herein.

At block 312, one or more segmentation rules associated with the second group are determined. The determination of the segmentation rules associated with the second group may be based on analyzing the each of segmentation rules that apply to the entities of the second group, as described herein.

At block 314, communication properties between the first group and the second group are determined. The communication properties may be include whether some, all, or no communication is allowed between the first and second group. In some embodiments, the communication properties may be on a per port basis, protocol basis, entity characteristic(s) (e.g., account type, user, application, device type, location) basis, etc. For example, the communication properties may include that devices in the first and second group may communicate on port 80 but not on other ports/services.

At block 316, an indication of the communication properties between the first group and second group is displayed. The indication of the communication properties may be displayed as part of a graphical user interface (GUI). The graphical user interface may include a matrix showing communication properties and the associated indicator between source and destination groups (e.g., FIG. 5), as described herein. In some embodiments, the indicator may be colored based on the communication properties between the groups. For example, indicator have a green color when all communication is allowed between the groups, a yellow color when some communication is allowed between the group, or a red color when communication between the groups is not allowed or blocked. The indicator may also be displayed as part of a hierarchy (e.g., when the first and the second groups are subgroups of other groups or one is a subgroup of the other group).

Block 302 may then be performed (e.g., if segmentation rules are not being simulated) as part of a continuous, real-time, or combination thereof monitoring of the network to dynamically manage segmentation on the network. Block 302 may also be performed each time an entity communicatively coupled to the network (e.g., new devices and returning devices).

At block 318, network traffic is stored. The network traffic may be stored by a device (e.g., network monitor 102) based on receiving traffic from multiple network devices (e.g., network device 104, firewalls 202-206, switch 210, etc.). This traffic may be stored and then used to simulate network segmentation rules to determine which, if any, proposed or tested segmentation rules are not currently being enforced (e.g., violated or would block existing traffic) or to determine if communication is inappropriately being blocked.

At block 320, another indicator of communication properties between the first and second group based on a simulation of at least one of the plurality of segmentation rules is displayed. In various embodiments, after network traffic has been stored and compared against one or more segmentation rules, the indicator may indicate the traffic is occurring in violation of the segmentation rules. For example, the indicator may flash on the GUI or be colored red where traffic has violated a simulated segmentation rule, e.g., where a firewall has not been configured to enforce the rule and communication is being allowed in violation of the simulated segmentation rule. This may occur where a segmentation rules is configured on a portion of the enforcement points of a network. In some embodiments, selecting the indicator may show which enforcement point(s) are associated with the violation of the segmentation rule. Embodiments may thus assist in determining whether segmentation rules are being properly enforced by enforcement points.

Block 302 may then be performed as part of a continuous, real-time, or combination thereof monitoring of the network to dynamically manage segmentation on the network. Block 302 may also be performed each time an entity communicatively coupled to the network (e.g., new devices and returning devices).

In some embodiments, the visual indicator may be selected and a menu presented for invoking a function to whitelist (or allow) or blacklist (or block) the traffic. The whitelisting or blacklisting of the traffic may include modifying the segmentation rules of enforcement points, as described herein. In various embodiments, an option to block the entity from communicating (e.g., with the rest of the network) may be selected and then the entity is isolated (e.g., by changing the VLAN entity or quarantining the entity) thereby allowing analysis of the entity while protecting the network.

While example GUIs 400-900 of FIGS. 4-9 may be described with respect to devices or device groups, embodiments support other entities (e.g., users, services, etc.). GUIs 400-900 may be rendered or displayed by a device (e.g., network monitor device 102 or network monitor device 280).

Figure 4:
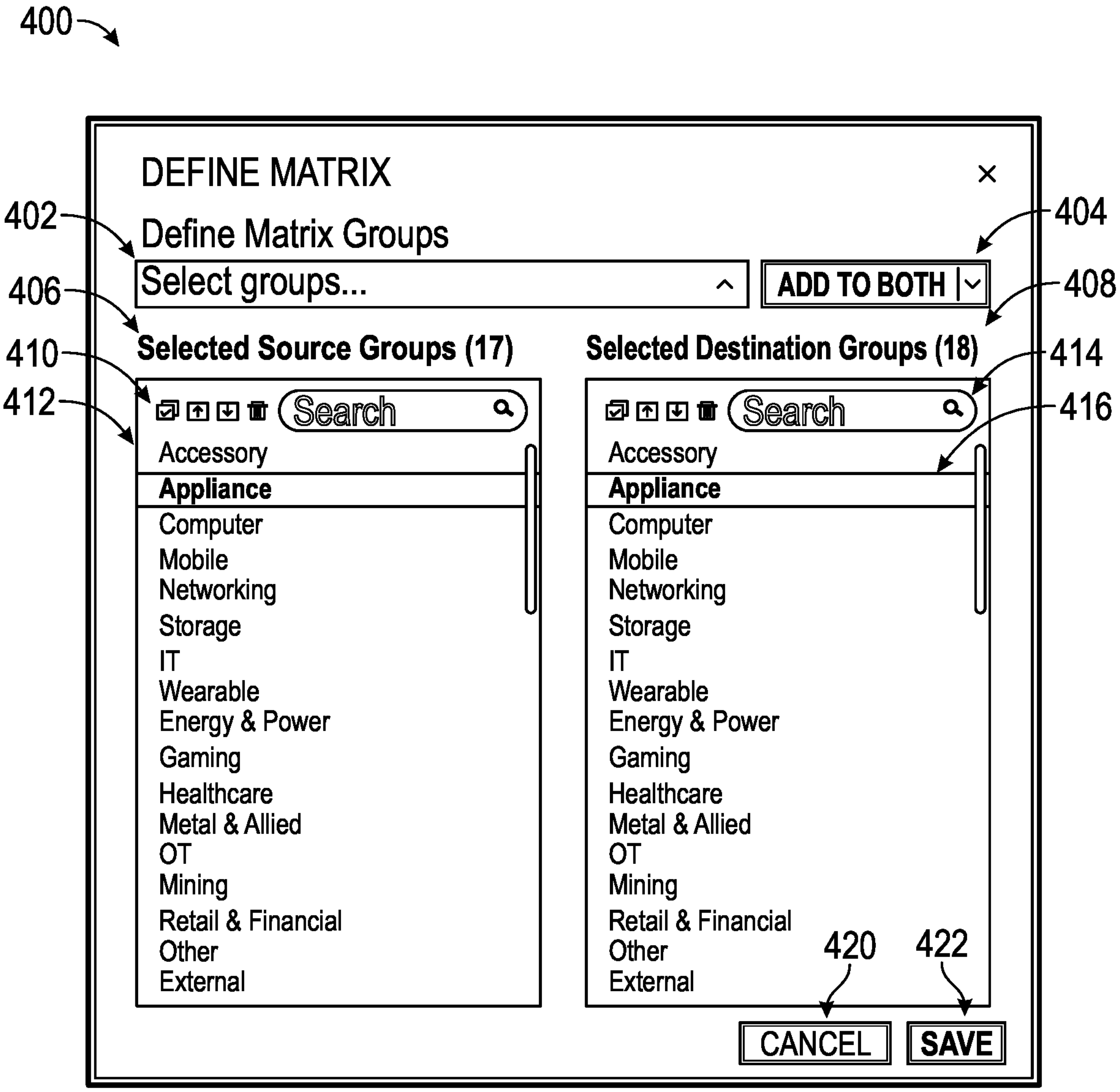
FIG. 4 depicts a diagram of aspects of an example graphical user interface for configuring a matrix in accordance with one implementation of the present disclosure.

FIG. 4 depicts a diagram of aspects of an example graphical user interface for configuring a matrix in accordance with one implementation of the present disclosure. Example graphical user interface (GUI) 400 is configured for viewing, selecting groups, and selecting source and destination groups (e.g., on computer network 100, network 200, etc.), etc. Example GUI 400 includes selection area 402, button 404, source group area 406, destination group area 408, cancel button 420, and save button 422. GUI 400 can be used to configure a matrix (e.g., FIGS. 5-6) for configuring, managing, and simulating segmentation polices (e.g., as shown in FIGS. 5-8).

Selection area 402 allows for selection of groups (e.g., via a drop down list based on groups with entities detected on the network). Button 404 is operable for the adding a group to a source group, a destination group, or to both source and destination groups. Source group area 406 includes group list area 412 which includes a list of the groups selected for the source group of the matrix and group options area 410. Group options area 410 includes a button (e.g., checkbox icon) for selecting each of the groups in the source group by selecting respective check boxes (not shown), buttons for changing the order of the groups (e.g., up and down arrows) as they will appear in the matrix, a delete button for removing one or more selected groups (e.g., a trash can button), and a search bar (e.g., text field with a magnifying glass icon button) for allowing searching the list of groups.

Destination group area 408 includes group list area 414 which includes a list of the groups selected for the destination group of the matrix and group options area 416. Group options area 414 includes a button (e.g., checkbox icon) for selecting each of the groups in the destination group by selecting respective check boxes (not shown), buttons for changing the order of the groups (e.g., up and down arrows) as they will appear in the matrix, a delete button for removing one or more selected groups (e.g., a trash can button), and a search bar (e.g., text field with a magnifying glass icon button) for allowing searching the list of groups.

Cancel button 420 allow for canceling the defining of a matrix operation and save button 422 allows for saving the matrix configuration including groups in the source and destination groups and invoking display of the matrix.

Figure 5:
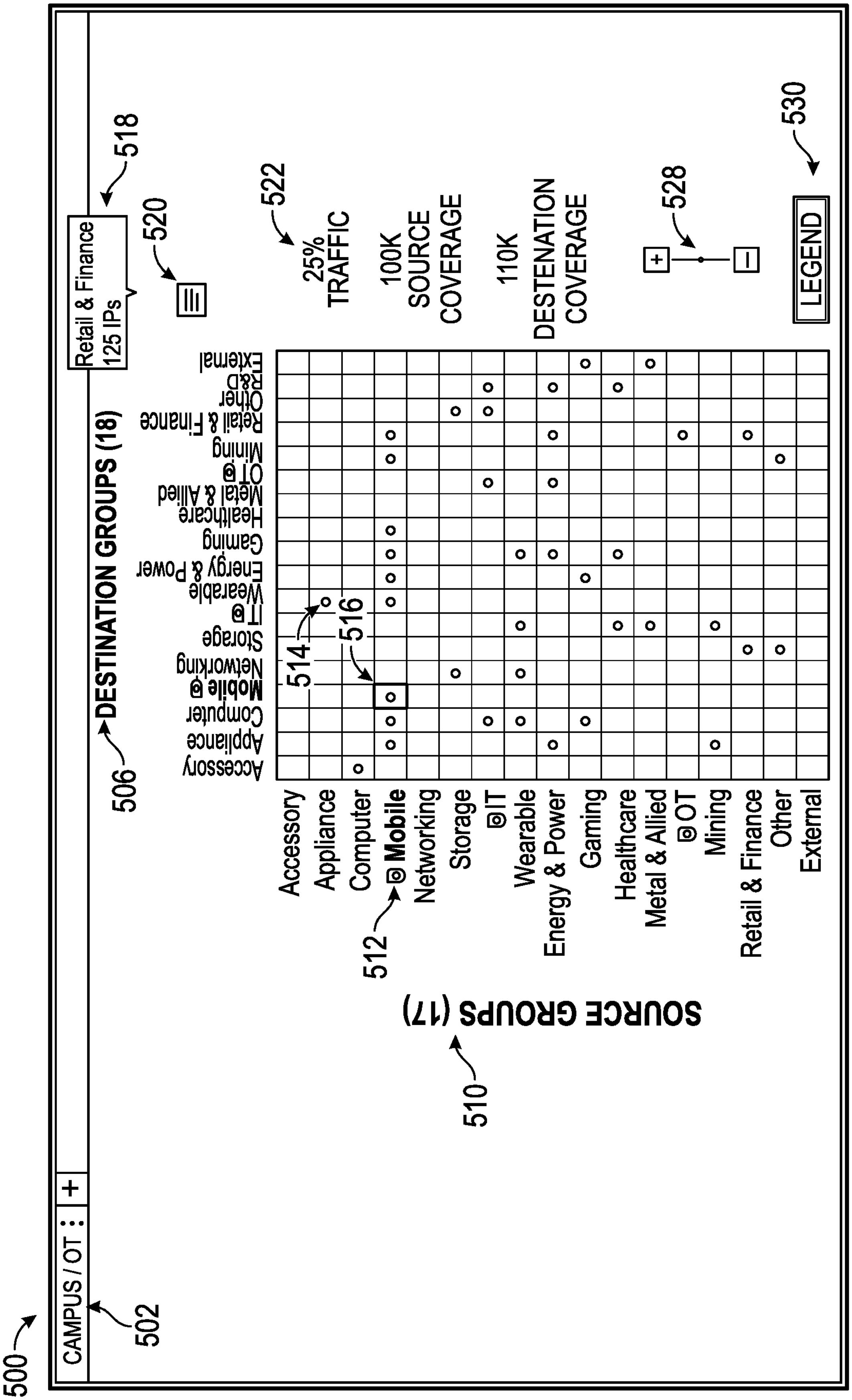
FIG. 5 depicts a diagram of aspects of an example graphical user interface including a matrix for visualizing segmentation in accordance with one implementation of the present disclosure.
Figure 7:
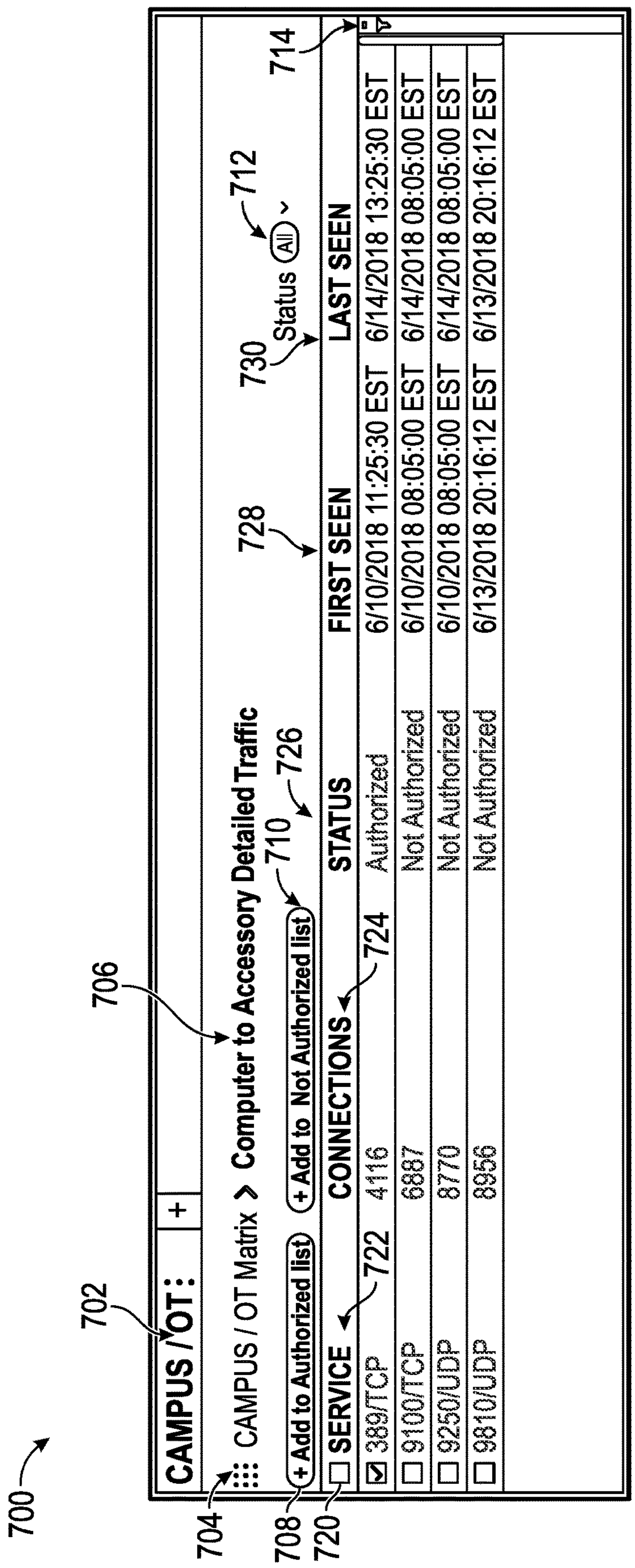
FIG. 7 depicts a diagram of aspects of an example graphical user interface including traffic details in accordance with one implementation of the present disclosure.

FIG. 5 depicts a diagram of aspects of an example graphical user interface including a matrix for visualizing segmentation in accordance with one implementation of the present disclosure. Example graphical user interface (GUI) 500 includes a matrix of source and destination groups with associated indicators based on one or more segmentation policies (e.g., with one or more segmentation rules, for instance on computer network 100 or network 200). Example GUI 500 includes matrix label 502, destination groups area 506, source groups area 510, nested group indicator 512, communications properties indicator 514, selected indicator 516, information box 518, menu 520, statistics area 522, zoom slider 528, and legend 530. It is noted that while example GUI 500 is described with respect to a campus and OT matrix, embodiments support other environments. GUI 500 can be used to select an intersection of source and destination groups on the matrix for viewing details of communications between source and destinations groups and configuring segmentation rules associated with the source and destination groups (e.g., as shown in FIGS. 7-8).

Matrix label 502 indicates one or more environments that the source and destination groups are associated with (e.g., campus and OT). Destination groups area 506 includes labels for the column for each of destination groups of the matrix. Source groups area 510 includes labels for the row for each of source groups of the matrix. The source and destination groups may be user selected via a GUI (e.g., FIG. 4), may be selected by default (e.g., based on a template), may be selected based on the entity groups present on a network, or combination thereof.

Nested group indicator 512 indicates that there are subgroups under the groups. For example, the mobile group may have subgroups with smartphones, tablets, Apple™ devices and Android™ devices. Communications properties indicator 514 indicates what level of communication is allowed between the groups at the intersection of the matrix. For example, communications properties indicator 514 may indicate that some, all, or no communications are allowed between the groups (e.g., with red, yellow, or green indicators).

Selected indicator 516 (e.g., a square) indicates the intersection of groups that is selected and further action (e.g., double clicking) can invoke presentation of a GUI (e.g., FIG. 7 or 8) to enable viewing, configuration, simulation, or a combination thereof of segmentation rules between the groups. Information box 518 provides details into a group (e.g., based on a mouse over). For example, information box 518 may expand the name of the group and indicate how many IP addresses are associated with the group (e.g., can be based on user, application, or type of entity, etc.).

Figure 6:
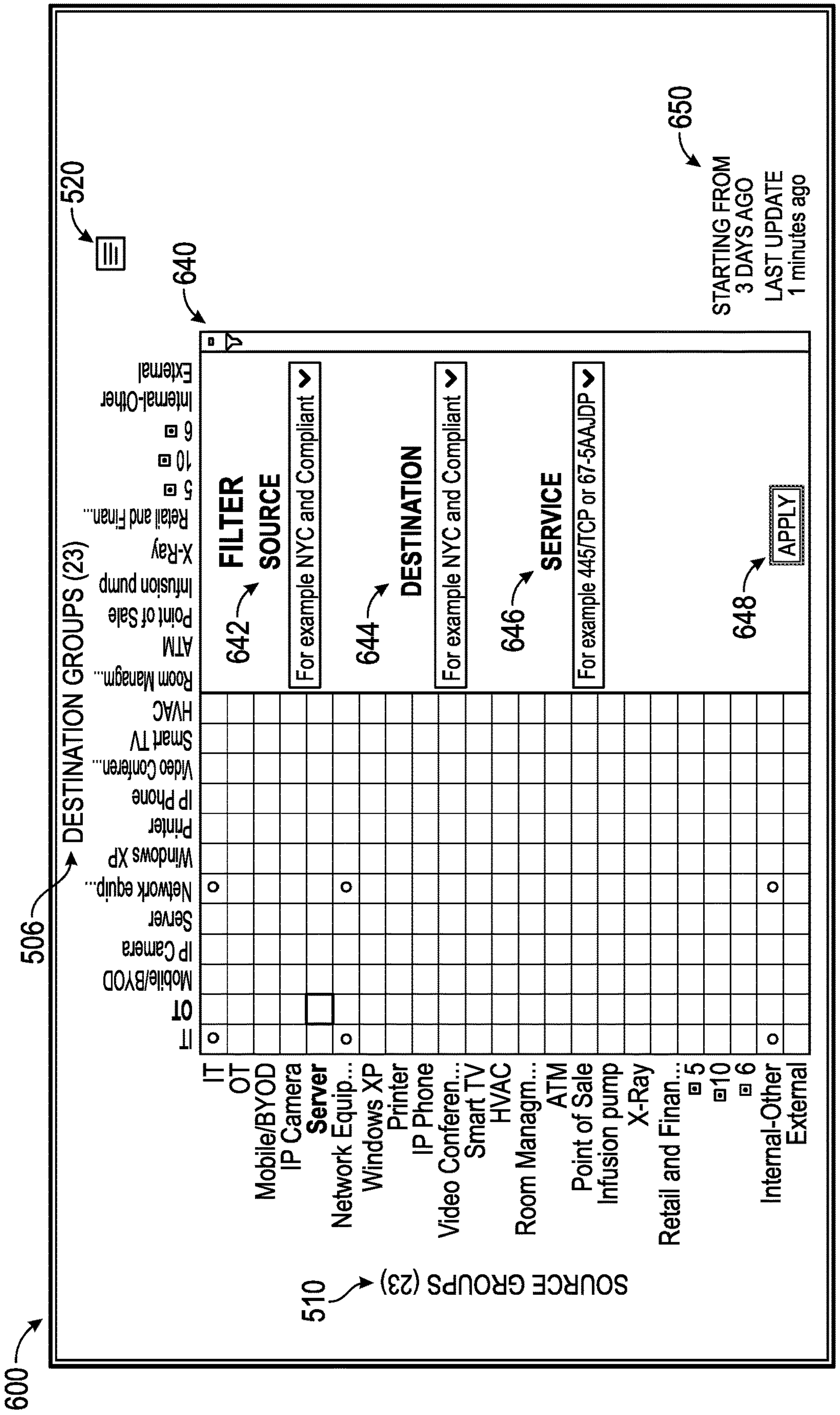
FIG. 6 depicts a diagram of aspects of an example graphical user interface including a matrix configuration interface in accordance with one implementation of the present disclosure.

Menu 520 allows access of options to define that matrix (e.g., FIG. 4), resetting traffic statistics or traffic collection, and setting filtering (e.g., FIG. 6). Statistics area 522 shows various statistics related to the matrix. For example, statistics area 522 indicates that the matrix, including the source and destination groups, represents 25% of the network traffic, covers 100,000 source entities, and 110,000 destination entities. Statistics area 522 may thus indicate how much the selected source and destination groups of the matrix cover traffic visibility across the network. Zoom slider 528 allows scaling of the matrix to make matrix larger or smaller on the display.

Legend 530 invokes display of a legend associated with the icons of the matrix. The legend may include explanations of the icons and colors of the matrix (e.g., a green color when all communication is allowed between the groups, a yellow color when some communication is allowed between the groups, or a red color when communication between the groups is not allowed or blocked). Legend 530 may also allow a user to turn on or off or filter various communication properties indicators (e.g., turn off display of the green indicators thereby allowing focus on the yellow and red indicators).

FIG. 6 depicts a diagram of aspects of an example graphical user interface including a matrix configuration interface in accordance with one implementation of the present disclosure. FIG. 6 shows a GUI substantially similar to FIG. 5 with a filter configuration area 640 (e.g., accessed via menu 520) shown. Filter configuration area 640 allows for filtering entities of the source and destination groups for particular characteristics or services that will be shown in the matrix. Filter configuration area 640 includes source characteristic selection area 642, destination characteristics selection area 644, service selection area 646, apply button 648, and statistics area 650.

Source characteristic selection area 642 allows for selection (e.g., via a dropdown) of characteristics to filter entities of the source groups for display on the matrix. For example, source characteristics selection area 642 may be used to filter the entities of source groups of the matrix for the communications that are for entities in a specific location (e.g., New York City), compliance, network connection, risk, etc. Destination characteristics selection area 644 allows for selection (e.g., via a dropdown) of characteristics to filter entities of the destination groups for display on the matrix. For example, destination characteristics selection area 644 may be used to filter the entities of the destination groups of the matrix for the communications that are for entities in a specific location (e.g., New York City), compliance, network connection, risk, etc.

Service selection area 646 allows for selection (e.g., via a dropdown) of services, protocol, or a combination thereof to filter for display on the matrix. For example, service selection area 646 may allow filtering for communications on TCP port 445 or UDP ports 67-68 on the source and destination groups of the matrix.

Apply button 648 applies filters based on the selections in source characteristic selection area 642, destination characteristics selection area 644, service selection area 646. Statistics area 650 shows the starting time for when traffic monitoring began and when the last update occurred.

It is noted that while example GUIs 700-800 is described with respect to services, embodiments support other entities (e.g., users, devices, etc.). GUI 700-800 can be used to configure monitoring or simulation mode of a segmentation policy.

FIG. 7 depicts a diagram of aspects of an example graphical user interface including traffic details in accordance with one implementation of the present disclosure. Example graphical user interface (GUI) 700 is configured for viewing and configuring whether communications are authorized between source and destination groups (e.g., on computer network 100 or network 200). Example GUI 700 may also be used for used for anomaly detection (e.g., network traffic that is in violation of a segmentation rule, for instance, due to the rule not being configured on an enforcement point or not yet implemented). Example GUI 700 enables a user to select traffic flows and filter them based on authorized or unauthorized status. A user may then create a segmentation policy with allowed (e.g., authorized rules) and then enforce the rules to allow only authorized traffic. Example GUI 700 can thus be used to configure whether groups of entities are authorized to communicate or not authorized to communicate through a GUI that simplifies segmentation management (e.g., hides the details of the particular segmentation rules that will be configured on each enforcement point).

Example GUI 700 includes label 702, matrix label 704, groups label 706, add to authorized list button 708, add to not authorized list button 710, status selector 712, selection column 720, service column 722, connections column 724, status column 727, first seen column 728, last seen column 730, and filter menu 714.

Label 702 indicates the associated matrix and the one or more environments that the source and destination groups are associated with (e.g., campus and OT). Matrix label 704 indicates the matrix from which an intersection of source and destination groups was selected. Groups label 706 indicates the source group (e.g., computer group) and destination group (e.g., accessory group) for which detailed traffic is being presented.

Add to authorized list button 708 allows a service to be added to the segmentation rules that allow communication between the source and destination groups. Add to not authorized list button 710 allows a service to be added to the segmentation rules blocking communication between the source and destination groups.

Status selector 712 allows for viewing authorized traffic, unauthorized traffic, all traffic, or baseline traffic in the columns (e.g., columns 720-730) of example GUI 700. Selection column 720 allows the selection of services to add to either the authorized list or not authorized list (e.g., using add to authorized list button 708 and add to not authorized list button 710). The services may be added to the authorized list or not authorized list for a simulation or implementation of the segmentation policy.

Service column 722 indicates the service that is associated with a segmentation rule or has been observed on the network traffic between the source and destination groups. Connections column 724 indicates the number of connections that have been observed for the associated service. Status column 727 indicates whether a service is authorized or not authorized (e.g., on the authorized list or not authorized list).

First seen column 728 indicates that first time communications of that service were observed in the network traffic. Last seen column 730 indicates that last time communications of that service were observed in the network traffic. Filter menu 714 invokes display of a filtering menu for filtering characteristics of the source and destination groups. For example, filter menu 714 may allow filtering of the source and destination groups data shown in example GUI 700 based on location, compliance, network connection, risk, etc.

FIG. 8 depicts a diagram of aspects of an example graphical user interface including filtered group traffic in accordance with one implementation of the present disclosure. Example graphical user interface (GUI) 800 is configured for viewing, selecting groups, and selecting source and destination groups (e.g., on computer network 100 or network 200) based on filtering the source and destination groups based on one or more characteristics. Example graphical user interface (GUI) 800 is configured for viewing and configuring whether communications are authorized between source and destination groups (e.g., on computer network 100 or network 200), including subgroups, in a hierarchical manner. Example GUI 800 may also be used for anomaly detection (e.g., network traffic that is in violation of a segmentation rule, for instance, due to the rule not being configured on an enforcement point or not yet implemented). Example GUI 800 enables a user to select traffic flows and filter them based on authorized or unauthorized status. A user may then create a segmentation policy with allowed (e.g., authorized rules) and then enforce the rules to allow only authorized traffic. Example GUI 800 can thus be used to configure whether groups of entities are authorized to communicate or not authorized to communicate through a GUI that simplifies segmentation management (e.g., hides the details of the particular segmentation rules that will be configured on each enforcement point).

Example GUI 800 includes label 802, matrix label 804, groups label 806, add to authorized list button 808, add to not authorized list button 810, status selector 812, source group column 814, destination group column 816, selection column 820, service column 822, connections column 824, status column 829, first seen column 828, last seen column 830, filter menu 814, and legend 840.

Label 802 indicates the associated matrix and the one or more environments that the source and destination groups are associated with (e.g., campus and OT). Matrix label 804 indicates the matrix from which an intersection of source and destination groups was selected. Groups label 806 indicates the source group (e.g., IT group) and destination group (e.g., OT group) for which detailed and filtered traffic is being presented.

Add to authorized list button 808 allows a service to be added to the segmentation rules for allowing communication between the source and destination groups. Add to not authorized list button 810 allows a service to be added to the segmentation rules for blocking communication between the source and destination groups. Status selector 812 allows for viewing authorized traffic, unauthorized traffic, all traffic, or baseline traffic in the columns (e.g., columns 820-830) of example GUI 800.

Service column 822 allows selection of a service that is associated with a segmentation rule or has been observed on the network traffic between the source and destination groups. Columns 814-816, 820, and 824-830 then indicate the groups and details associated with the groups that have communicated based on the selected service. Columns 814-816, 820, and 824-830 further indicate the subgroups and associated details.

Selection column 820 allows the selection of groups/subgroups to add to either the authorized list or not authorized list (e.g., using add to authorized list button 808 and add to not authorized list button 810). The groups/subgroups may be added to the authorized list or not authorized list for a simulation or implementation of the segmentation policy.

Source group column 814 indicates the one or more source groups associated with a selected service. Destination group column 816 indicates the one or more destination groups associated with a selected service. Source group column 814 and destination group column 816 may display in a hierarchical manner the subgroups of a selected group. For example, security camera source group has communicated with the HMI—FL3 and PLC—Factory TLV subgroups. The tree level of these subgroups may be indicated based on the color scheme of legend 840.

Connections column 824 indicates the number of connections that have been observed for the associated service and group/subgroup. Status column 826 indicates whether a service is authorized or not authorized (e.g., on the authorized list or not authorized list).

First seen column 828 indicates that first time communications on that service were observed in the network traffic. Last seen column 830 indicates that last time communications on that service were observed in the network traffic.

Filter menu 814 invokes display of a filtering menu (e.g., similar to filter configuration area 640) for filtering characteristics of the source and destination groups. For example, filter menu 814 may allow filtering of the source and destination groups data shown in example GUI 800 based on location, compliance, network connection, risk, etc.

Legend 840 includes color indicators for respective tree levels based on the groups and subgroups of the destination and source groups. Legend 840 thus allows for a color based indication of depth and an indication of where a subgroup is in a nested group. For example, orange may be used for tree level 1, red may be used for tree level 2, blue for tree level 3, and purple for tree level 4 & up.

Figure 9:
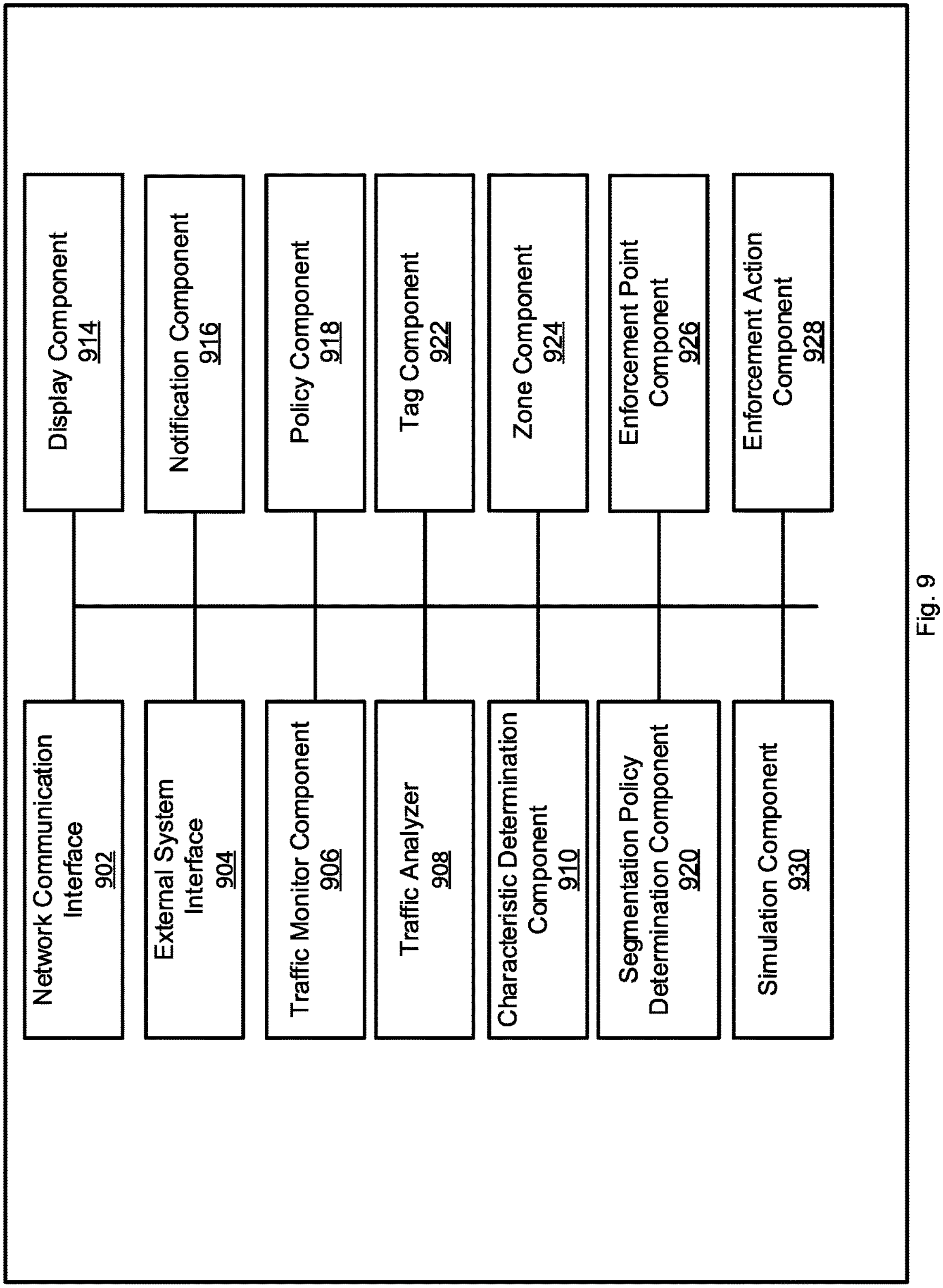
FIG. 9 depicts illustrative components of a system for segmentation visualization, configuration, simulation, or a combination thereof in accordance with one implementation of the present disclosure.

FIG. 9 illustrates example components used by various embodiments. Although specific components are disclosed in system 900, it should be appreciated that such components are examples. That is, embodiments are well suited to having various other components or variations of the components recited in system 900. It is appreciated that the components in system 900 may operate with other components than those presented, and that not all of the components of system 900 may be required to achieve the goals of system 900.

FIG. 9 depicts illustrative components of a system for segmentation visualization, configuration, simulation, or a combination thereof in accordance with one implementation of the present disclosure. Example system 900 includes a network communication interface 902, an external system interface 904, a traffic monitor component 906, a traffic analyzer 908, characteristic determination component 910, segmentation policy determination component 920, a display component 914, a notification component 916, a policy component 918, segmentation policy determination component 920, tag component 922, zone component 924, enforcement point component 926, enforcement action component 928, and simulation component 930. The components of system 900 may be part of a computing system or other electronic device (e.g., network monitor device 102) or a virtual machine and be operable to monitor and one or more entities communicatively coupled to a network, monitor network traffic, and manage segmentation policies and rules on one or more enforcement points. For example, the system 900 may further include a memory and a processing device, operatively coupled to the memory, which may perform the functions of or execute the components of system 900. The components of system 900 may access various data and characteristics associated with an entity (e.g., network communication information) and data associated with one or more entities. It is appreciated that the modular nature of system 900 may allow the components to be independent and allow flexibility to enable or disable individual components or to extend/upgrade components without affecting other components thereby providing scalability and extensibility. System 900 may perform one or more blocks of flow diagram 300.

Communication interface 902 is operable to communicate with one or more entities (e.g., network device 104, firewalls 202-206, switch 210, etc.) coupled to a network that are coupled to system 900 and receive or access information about entities (e.g., entity communications, entity characteristics, etc.) and segmentation policies and rules (e.g., from one or more enforcement points), as described herein. The communication interface 902 may be operable to work with one or more components to initiate access to characteristics about an entity to allow determination of one or more tags and assigning actions based on the tags or one or more enforcement points, as described herein. Communication interface 902 may be used to receive and store network traffic for segmentation policy management and simulation, as described herein.

External system interface 904 is operable to communicate with one or more third party, remote, or external systems to access information including characteristics about an entity. External system interface 904 may further store the accessed information in a data store. For example, external system interface 904 may access information from a vulnerability assessment (VA) system to enable determination of one or more compliance tags to be associated with the entity. External system interface 904 may be operable to communicate with a vulnerability assessment (VA) system, an advanced threat detection (ATD) system, a mobile device management (MDM) system, a firewall (FW) system, a switch system, an access point (AP) system, etc. External system interface 904 may query a third party system using an API or CLI. For example, external system interface 904 may query a firewall for information (e.g., network session information) about an entity or for a list of entities that are communicatively coupled to the firewall and communications associated therewith. In some embodiments, external system interface 904 may query a firewall or other system for information of communications associated with an entity.

Traffic monitor component 906 is operable to monitor network traffic to determine if a new entity has joined the network or an entity has rejoined the network and monitor traffic for analysis by traffic analyzer 908, as described herein. Traffic analyzer 908 is configured to perform analysis of network traffic (e.g., in real-time, with machine learning, etc.) to and from an entity thereby providing analysis of end to end communications of an entity. Traffic monitor component 906 is further operable to store network traffic (e.g., from network devices and enforcement points, for instance, network device 104, firewalls 202-206, and switch 210) for use by other components for simulation of segmentation rules, facilitating configuration of segmentation rules, or a combination thereof.

Traffic analyzer 908 may have a packet engine operable to access packets of network traffic (e.g., passively) and analyze the network traffic. The traffic analyzer 908 may be configured to perform active or passive traffic analysis or a combination thereof. The traffic analyzer 908 may further be able to access and analyze traffic logs from one or more entities (e.g., network device 104, system 150, or aggregation device 106) or from an entity being monitored. The traffic analyzer 908 may further be able to access traffic analysis data associated with an entity being monitored, e.g., where the traffic analysis is performed by a third party system. Information of traffic analyzer 908 may be stored, displayed, and used as a basis for segmentation rule configuration, validation, or simulation.

Characteristic determination component 910 is configured to determine one or more characteristics of an entity, as described herein. The entity characteristics can then be stored and used by other components for performing segmentation management including visualization, configuration, simulation, or a combination thereof.

Segmentation determination policy component 920 is configured to determine or select a segmentation policy based on the one or more characteristics of one or more entities of a group, as described herein. Segmentation determination policy component 920 may be further configured to determine subgroups of entity groups based on characteristics and determine segmentation rules associated with the groups (and entities/subgroups), as described herein. Segmentation determination policy component 920 may be configured for accessing segmentation policies or rules from one or more enforcement points and determining communication properties, as described herein.

Display component 914 is configured to optionally display one or more graphical user interfaces (e.g., FIGS. 4-8) or other interfaces (e.g., command line interface) for depicting various information associated with entities and segmentation including one or more matrixes and hierarchies, as described herein. In some embodiments, display component 914 may display or render a network graph of entities, tags associated with entities, and other segmentation information (e.g., service associated entity group information).

Notification component 916 is operable to initiate one or more notifications based on the results of monitoring communications or characteristics of one or more entities and segmentation rules (e.g., alerting of segmentation rule violation), as described herein. The notification may be any of a variety of notifications, e.g., IT ticket, email, SMS, a HTTP notification, etc., as described herein.

Policy component 918 is operable for initiating or triggering one or more remediation actions or security actions according to one or more policies, e.g., based on a segmentation rule violation, as described herein. Policy component 918 may further be configured to perform other functions including checking compliance status, finding open ports, etc. Policy component 918 may restrict network access, signal a patch system or service, signal an update system or service, etc., as described herein. The policy component 918 may thus, among other things, invoke automatically patching, automatically updating, and automatically restrict network access of an entity (e.g., that has out-of-date software or based on segmentation violation).

The actions may include restricting network access to a particular level (e.g., full, limited, or no network access), remediation actions (e.g., triggering patch systems or services, triggering update systems or services, triggering third party product action, etc.), informational actions (e.g., sending an email notification to a user or IT administrator or creating an IT ticket reflecting the level of compliance), and logging actions (e.g., logging or storing the compliance level).

Tag component 922 is configured to determine one or more tags to be assigned to an entity based on one or more characteristics of the entity and assign the one or more tags to the entity, as described herein. Zone component 924 is configured to determine a zone based on the one or more tags assigned to an entity, as described herein. Enforcement point component 926 is configured to determine one or more enforcement points (e.g., network devices) associated with the zone for the entity, as described herein. Enforcement action component 928 is configured to assign one or more enforcement actions to the one or more enforcement points based on the zone associated with the entity, as described herein.

Simulation component 930 is configured to simulate one or more proposed segmentation polices based on network traffic, as described herein. Simulation component 930 may also determine if one or more proposed segmentation rules have been violated, as described herein.

The system 900 may be software stored on a non-transitory computer readable medium having instructions encoded thereon that, when executed by a processing device, cause the processing device to access a plurality of segmentation rules and determine, with the processing device, one or more characteristics of a plurality of entities communicatively coupled to a network. The instructions may further cause the processing device to determine a plurality of groups based on at least one characteristic of the one or more characteristics, wherein each group comprises at least one entity of the plurality of entities, and select a first group and a second group from the plurality of groups. The instructions may further cause the processing device to determine one or more segmentation rules associated with the first group and determine one or more segmentation rules associated with the second group. The instructions may further cause the processing device to determine communication properties between the first group and second group and display an indication of the communication properties between the first group and the second group.

In some embodiments, the instructions may further cause the processing device to store traffic from the network and display another indicator of communication properties between the first and the second group based on a simulation of at least one of the plurality of segmentation rules. In various embodiments, the another indicator is associated with a violation of a segmentation rule of the plurality of segmentation rules. In some embodiments, the at least one characteristic of the one or more characteristics of an entity is determined without use of an agent. In various embodiments, the indicator comprises at least one of a green color associated with allowed communication, a yellow color associated with some allowed communication, or a red color associated with blocked communication.

In some embodiments, the indication is displayed as part of a matrix comprising a first entity characteristic of the first group and a second entity characteristic of the second group. In various embodiments, a subgroup based on at least one characteristic of at least one entity of the first group is displayed in a hierarchy with the first group. In some embodiments, the at least one characteristic is at least one of location, device type, compliance, risk, or network connection.

In various embodiments, a subgroup based on a plurality of characteristics of at least one entity of the first group is displayed in a hierarchy with the first group. In some embodiments, the plurality of characteristics are user configurable. In various embodiments, the hierarchy is based on a plurality of tags. In some embodiments, the matrix is user configurable. In various embodiments, the indication of the communication properties between the first group and the second group is based on a simulation of at least one of the plurality of segmentation rules. In some embodiments, the plurality of entities comprises at least one of a device, an endpoint, a virtual machine, a service, a serverless service, a container, or a user.

Figure 10:
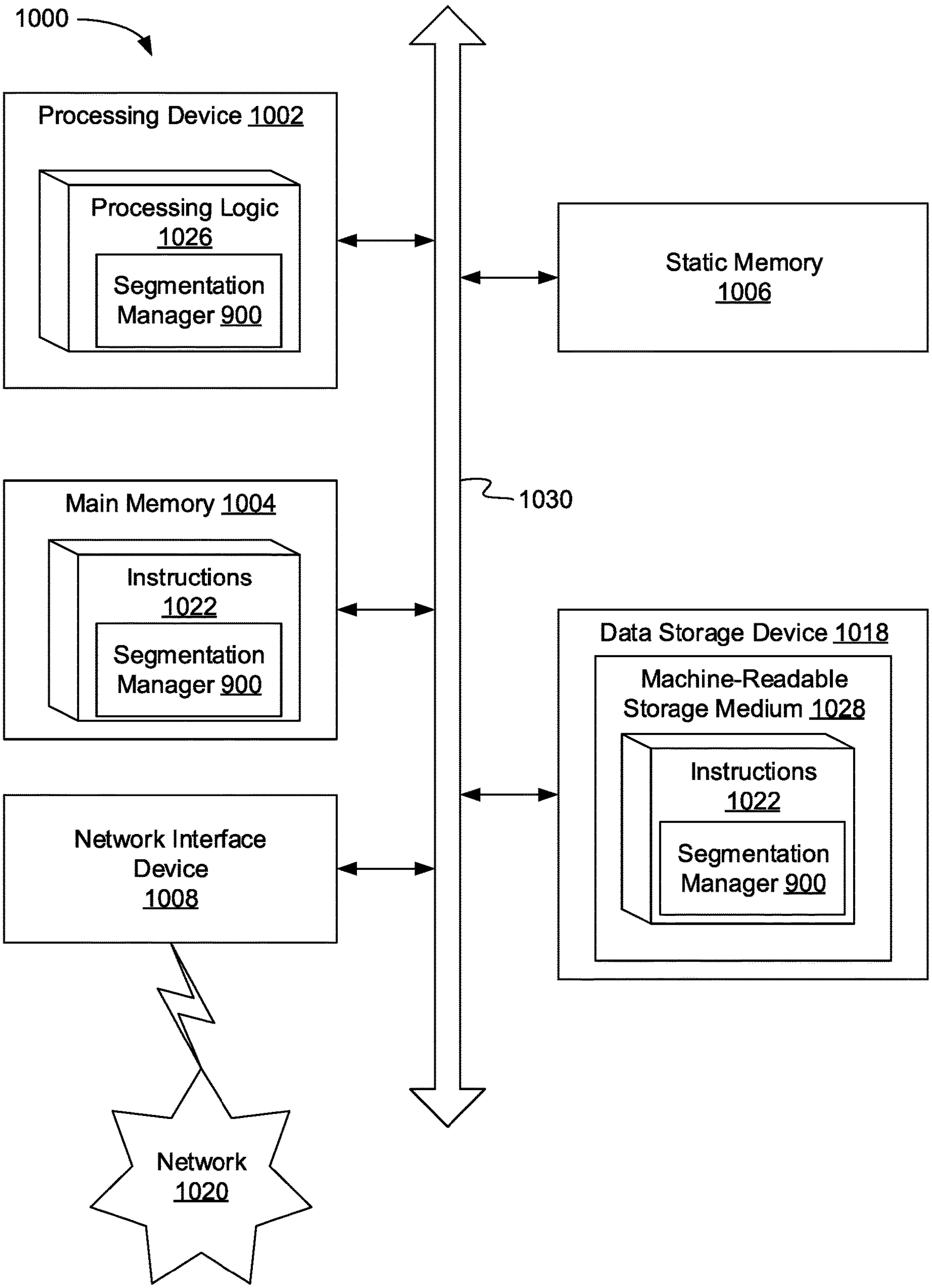
FIG. 10 is a block diagram illustrating an example computer system, in accordance with one implementation of the present disclosure.

FIG. 10 illustrates a diagrammatic representation of a machine in the example form of a computer system 1000 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 1000 may be representative of a server, such as network monitor device 102 running segmentation manager 900 to perform segmentation management including visualization, configuration, simulation, or a combination thereof, as described herein.

The exemplary computer system 1000 includes a processing device 1002, a main memory 1004 (e.g., read-only memory (ROM), flash memory, dynamic random access memory (DRAM), a static memory 1006 (e.g., flash memory, static random access memory (SRAM), etc.), and a data storage device 1018, which communicate with each other via a bus 1030. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 1002 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 is configured to execute processing logic 1026, which may be one example of segmentation manager 900 shown in FIG. 9, for performing the operations and steps discussed herein.

The data storage device 1018 may include a machine-readable storage medium 1028, on which is stored one or more set of instructions 1022 (e.g., software) embodying any one or more of the methodologies of functions described herein, including instructions to cause the processing device 1002 to execute segmentation manager 900. The instructions 1022 may also reside, completely or at least partially, within the main memory 1004 or within the processing device 1002 during execution thereof by the computer system 1000; the main memory 1004 and the processing device 1002 also constituting machine-readable storage media. The instructions 1022 may further be transmitted or received over a network 1020 via the network interface device 1008.

The machine-readable storage medium 1028 may also be used to store instructions to perform a method for managing segmentation including visualization, configuration, simulation, or a combination thereof, as described herein. While the machine-readable storage medium 1028 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
- tagging a plurality of entities communicatively coupled to a network;
- grouping the plurality of entities communicatively coupled to the network into a plurality of groups based at least on one or more tags that are associated with each of the plurality of entities;
- monitoring and storing network traffic;
- displaying one or more controls for selecting a first group and a second group from the plurality of groups;
- in response to receiving an input associated with the one or more controls, displaying, by a processing device, an indication of network traffic between the first group and the second group, the network traffic being associated with one or more segmentation rules received through the input or obtained from storage, wherein displaying the indication of the network traffic comprises performing a simulation with the stored network traffic in view of the one or more segmentation rules, and displaying network traffic resulting from the simulation; and
- in response to receiving a second input through the one or more controls, configuring an enforcement point with the one or more segmentation rules, the enforcement point being associated with the first group and the second group.

2. The method of claim 1, wherein the one or more controls comprises a first control configured to apply the one or more segmentation rules to an entire group, and a second control to apply the one or more segmentation rules to a single entity of the plurality of entities.

3. The method of claim 1, further comprising, in response to receiving, through the one or more controls, a selection of a service that is configured on an entity of the first group or the second group, displaying a subset of the network traffic resulting from the simulation, wherein the subset of the network traffic is associated with the service.

4. The method of claim 1, wherein tagging the plurality of entities includes generating one or more tags for each of the plurality of entities wherein at least one of the one or more tags are determined based on a characteristic of an entity that is independent of internet protocol (IP) address.

5. The method of claim 4, wherein grouping the plurality of entities is performed based on commonality of the one or more tags among the plurality of entities.

6. The method of claim 1, wherein displaying the indication of the network traffic comprises displaying an indication comprising at least one of a first visual indication associated in response to allowed communication between a first entity of the first group and a second entity of the second group, a second visual indication in response to partial allowed communication between the first entity of the first group and the second entity of the second group, and a third visual indication in response to blocked communication between the first entity of the first group and the second entity of the second group.

7. The method of claim 1, further comprising, in response to receiving a third input associated with the one or more controls, displaying a subset of the network traffic resulting from the simulation, wherein the subset of the network traffic is authorized, and in response to receiving a fourth input associated with the one or more controls, displaying a second subset of the network traffic resulting from the simulation, wherein the second subset of the network traffic is unauthorized.

8. A system comprising:
- a memory; and
- a processing device, operatively coupled to the memory, to:
- tag a plurality of entities communicatively coupled to a network;
- group the plurality of entities communicatively coupled to the network into a plurality of groups based at least on one or more tags that are associated with each of the plurality of entities;
- monitor and store traffic of the network;
- display one or more controls for selecting a first group and a second group from the plurality of groups;
- in response to receiving an input associated with the one or more controls, display an indication of network traffic between the first group and the second group, the network traffic being associated with one or more segmentation rules received through the input or obtained from storage, wherein to display the indication of the network traffic comprises to perform a simulation with the stored network traffic in view of the one or more segmentation rules, and to display network traffic resulting from the simulation; and
- in response to receiving a second input through the one or more controls, configure an enforcement point with the one or more segmentation rules, the enforcement point being associated with the first group and the second group.

9. The system of claim 8, wherein the one or more controls comprise a first control configured to apply the one or more segmentation rules to an entire group, and a second control to apply the one or more segmentation rules to a single entity of the plurality of entities.

10. The system of claim 8, wherein the processing device is further to, in response to receiving, through the one or more controls, a selection of a service that is configured on an entity of the first group or the second group, display a subset of the network traffic resulting from the simulation, wherein the subset of the network traffic is associated with the service.

11. The system of claim 8, wherein to tag the plurality of entities comprises to: generate one or more tags for each of the plurality of entities wherein at least one of the one or more tags are determined based on a characteristic of an entity that is independent of internet protocol (IP) address.

12. The system of claim 11, wherein to group the plurality of entities is performed based on commonality of the one or more tags among the plurality of entities.

13. A non-transitory computer readable medium having instructions encoded thereon that, when executed by a processing device, cause the processing device to:

tag a plurality of entities communicatively coupled to a network;

group the plurality of entities communicatively coupled to the network into a plurality of groups based at least on one or more tags that are associated with each of the plurality of entities;

monitor and store traffic of the network;

display one or more controls for selecting a first group and a second group from the plurality of groups;

in response to receiving an input associated with the one or more controls, display, by the processing device, an indication of network traffic between the first group and the second group, the network traffic being associated with one or more segmentation rules received through the input or obtained from storage, wherein to display the indication of the network traffic comprises to perform a simulation with the stored network traffic in view of the one or more segmentation rules, and to display network traffic resulting from the simulation; and in response to receiving a second input through the one or more controls, configure an enforcement point with the one or more segmentation rules, the enforcement point being associated with the first group and the second group.

14. The non-transitory computer readable medium of claim 13, wherein the one or more controls comprise a first control configured to apply the one or more segmentation rules to an entire group, and a second control to apply the one or more segmentation rules to a single entity of the plurality of entities.

15. The non-transitory computer readable medium of claim 13, wherein the processing device is further to, in response to receiving, through the one or more controls, a selection of a service that is configured on an entity of the first group or the second group, display a subset of the network traffic resulting from the simulation, wherein the subset of the network traffic is associated with the service.

16. The non-transitory computer readable medium of claim 13, wherein to tag the plurality of entities comprises to: generate one or more tags for each of the plurality of entities wherein at least one of the one or more tags are determined based on a characteristic of an entity that is independent of internet protocol (IP) address.

17. The non-transitory computer readable medium of claim 16, wherein to group the plurality of entities is performed based on commonality of the one or more tags among the plurality of entities.

* * * * *